еу(12) United States Patent
Shiotsu et al.

(10) Patent No.: US 8,274,384 B2
(45) Date of Patent: Sep. 25, 2012

(54) INFORMATION DEVICE CAPABLE OF PERFORMING WIRELESS COMMUNICATION WITH READER/WRITER DEVICE, PROGRAM, AND METHOD

(75) Inventors: Shinichi Shiotsu, Kawasaki (JP); Isamu Yamada, Kawasaki (JP); Satoshi Inano, Kawasaki (JP); Akira Itasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 946 days.

(21) Appl. No.: 12/241,709

(22) Filed: Sep. 30, 2008

(65) Prior Publication Data

US 2009/0091427 A1 Apr. 9, 2009

(30) Foreign Application Priority Data

Oct. 5, 2007 (JP) .................................. 2007-262143

(51) Int. Cl.
*G08B 1/08* (2006.01)
(52) U.S. Cl. ............... 340/539.3; 340/539.22; 340/7.32; 340/7.38; 340/7.37
(58) Field of Classification Search .................. 340/10.4, 340/10.1, 10.41, 10.3, 539.26–539.29, 7.32, 340/7.33, 7.37, 7.38, 539.3, 539.22; 9/10.4, 9/10.1, 10.41, 10.3, 539.26–539.29, 7.32, 9/7.33, 7.37
See application file for complete search history.

(56) References Cited

U.S. PATENT DOCUMENTS

| | | | | |
|---|---|---|---|---|
| 6,294,997 B1 * | 9/2001 | Paratore et al. | ............. | 340/572.1 |
| 6,473,607 B1 * | 10/2002 | Shohara et al. | ............. | 455/343.1 |
| 6,784,788 B2 * | 8/2004 | Beigel et al. | ................. | 340/10.4 |
| 6,828,905 B2 | 12/2004 | Normann et al. | | |
| 6,922,402 B1 | 7/2005 | Ko | | |

(Continued)

FOREIGN PATENT DOCUMENTS

JP 6-4724 1/1994

(Continued)

OTHER PUBLICATIONS

Japanese Patent Office Notification of Reasons for Refusal mailed Jun. 12, 2012 for corresponding Japanese Patent Application No. 2007-262143.

*Primary Examiner* — Albert Wong
*Assistant Examiner* — Peter Mehravari
(74) *Attorney, Agent, or Firm* — Staas & Halsey LLP

(57) ABSTRACT

An information device capable of performing wireless communication with a reader/writer device, a method, and a computer-readable medium are provided. The device includes a reception section that detects an information request signal transmitted from a reader/writer device and a transmission section that transmits a signal to the reader/writer device in response to the detection of an information request signal. The device also includes a detection data acquisition section that acquires detection data corresponding to a physical quantity or state from a sensor and a detection data storage section that stores the detection data. The device includes a control section that activates the detection data acquisition section at time intervals and inputs the acquired detection data into the detection data storage section and another control section that activates the reception section at other time intervals.

13 Claims, 24 Drawing Sheets

U.S. PATENT DOCUMENTS

| | | | |
|---|---|---|---|
| 6,972,682 B2 * | 12/2005 | Lareau et al. | 340/568.1 |
| 7,505,795 B1 * | 3/2009 | Lim et al. | 455/574 |
| 7,667,572 B2 * | 2/2010 | Husak et al. | 340/10.1 |
| 7,782,195 B2 * | 8/2010 | Agranat | 340/540 |
| 8,077,012 B2 * | 12/2011 | Batra et al. | 340/10.1 |
| 2003/0183697 A1 * | 10/2003 | Porter | 235/492 |
| 2004/0049428 A1 * | 3/2004 | Soehnlen et al. | 705/25 |
| 2004/0239524 A1 | 12/2004 | Kobayashi | |
| 2006/0006817 A1 * | 1/2006 | Chason et al. | 315/291 |
| 2008/0266050 A1 * | 10/2008 | Crouse et al. | 340/3.1 |

FOREIGN PATENT DOCUMENTS

| | | |
|---|---|---|
| JP | 2000-113130 | 4/2000 |
| JP | 2000-149176 | 5/2000 |
| JP | 2001-251210 | 9/2001 |
| JP | 2004-355164 | 12/2004 |
| JP | 2006-85573 | 3/2006 |
| JP | 2006-340048 | 12/2006 |
| JP | 2007-124433 | 5/2007 |
| WO | 01/17804 | 3/2001 |

* cited by examiner

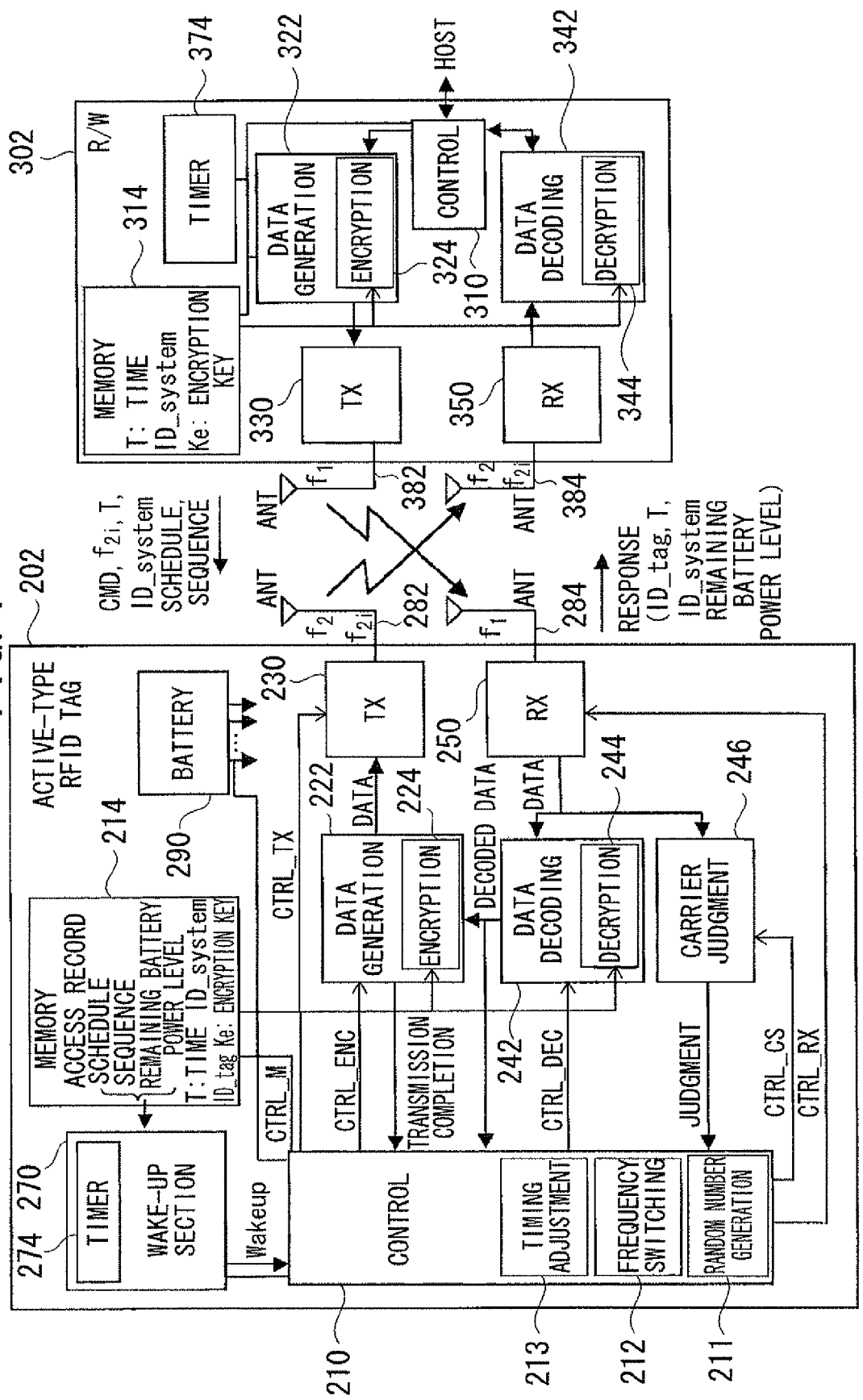

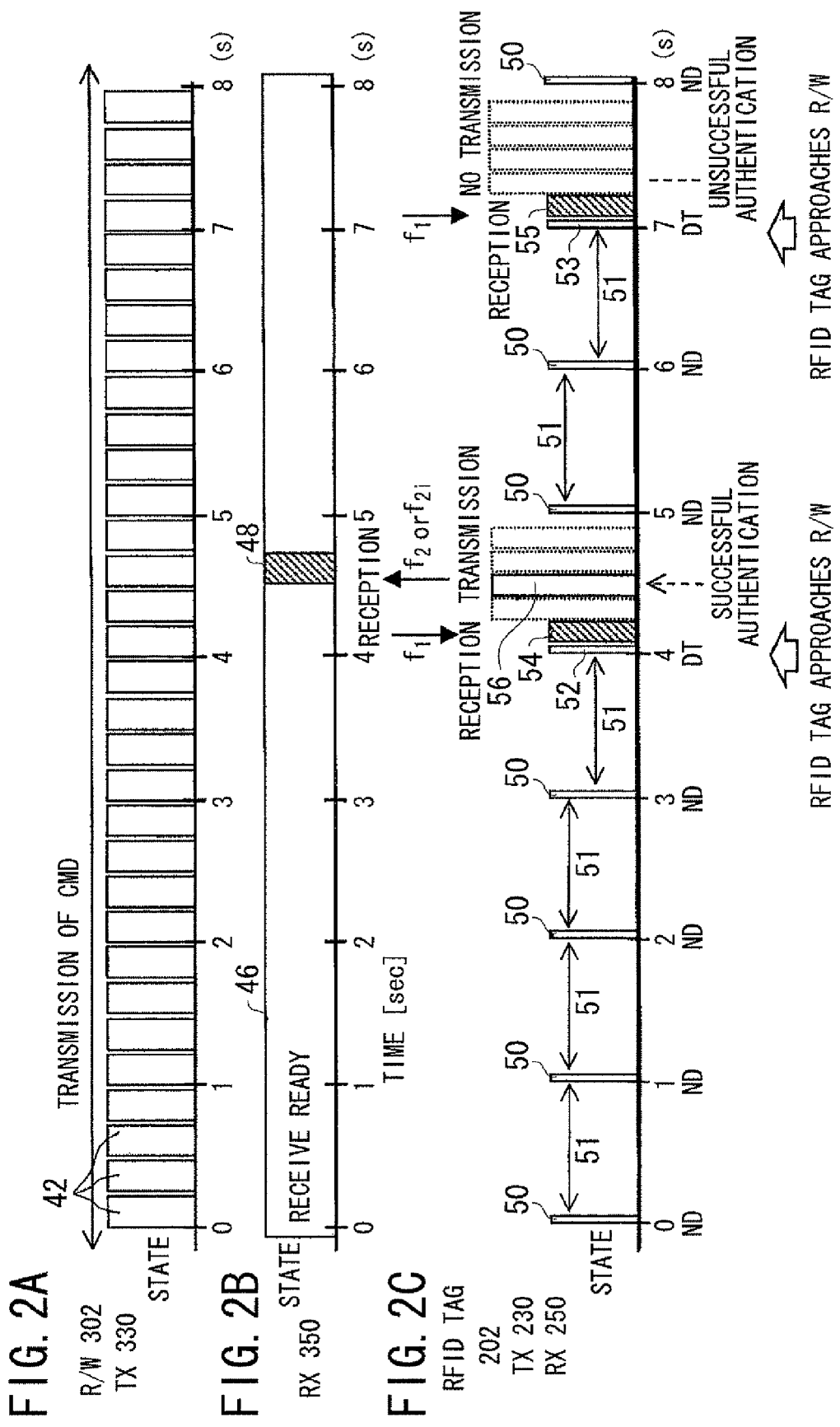

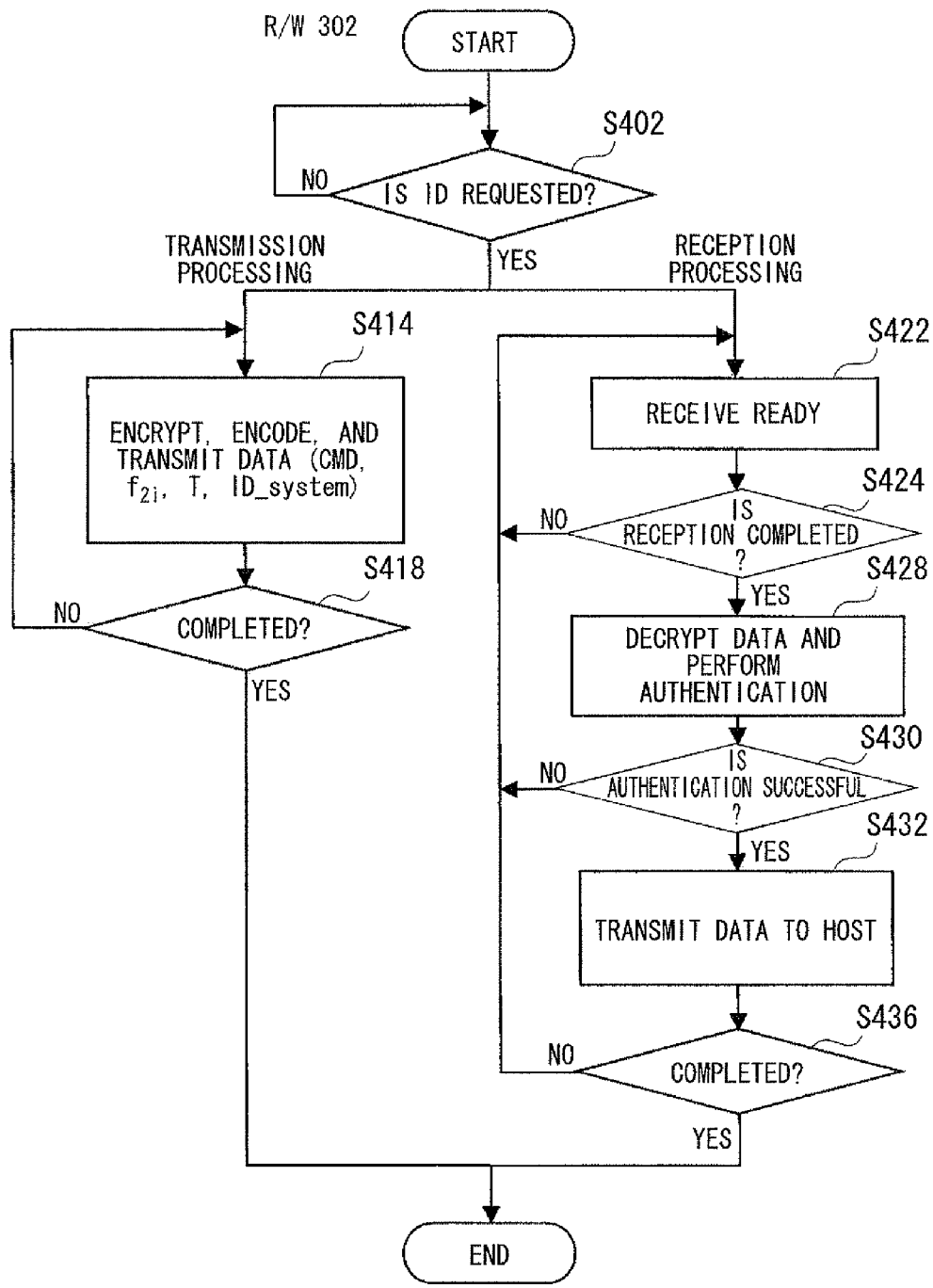

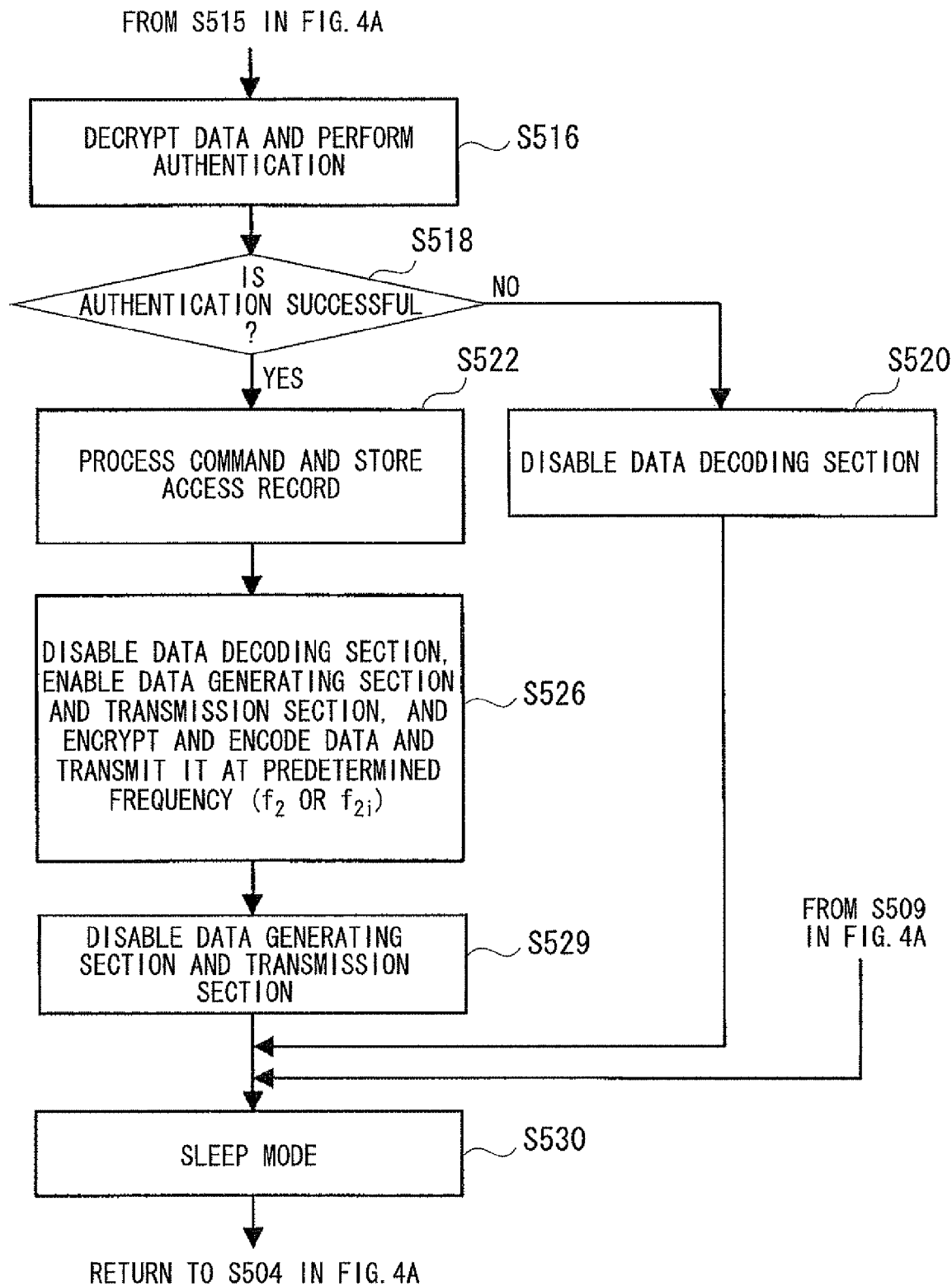

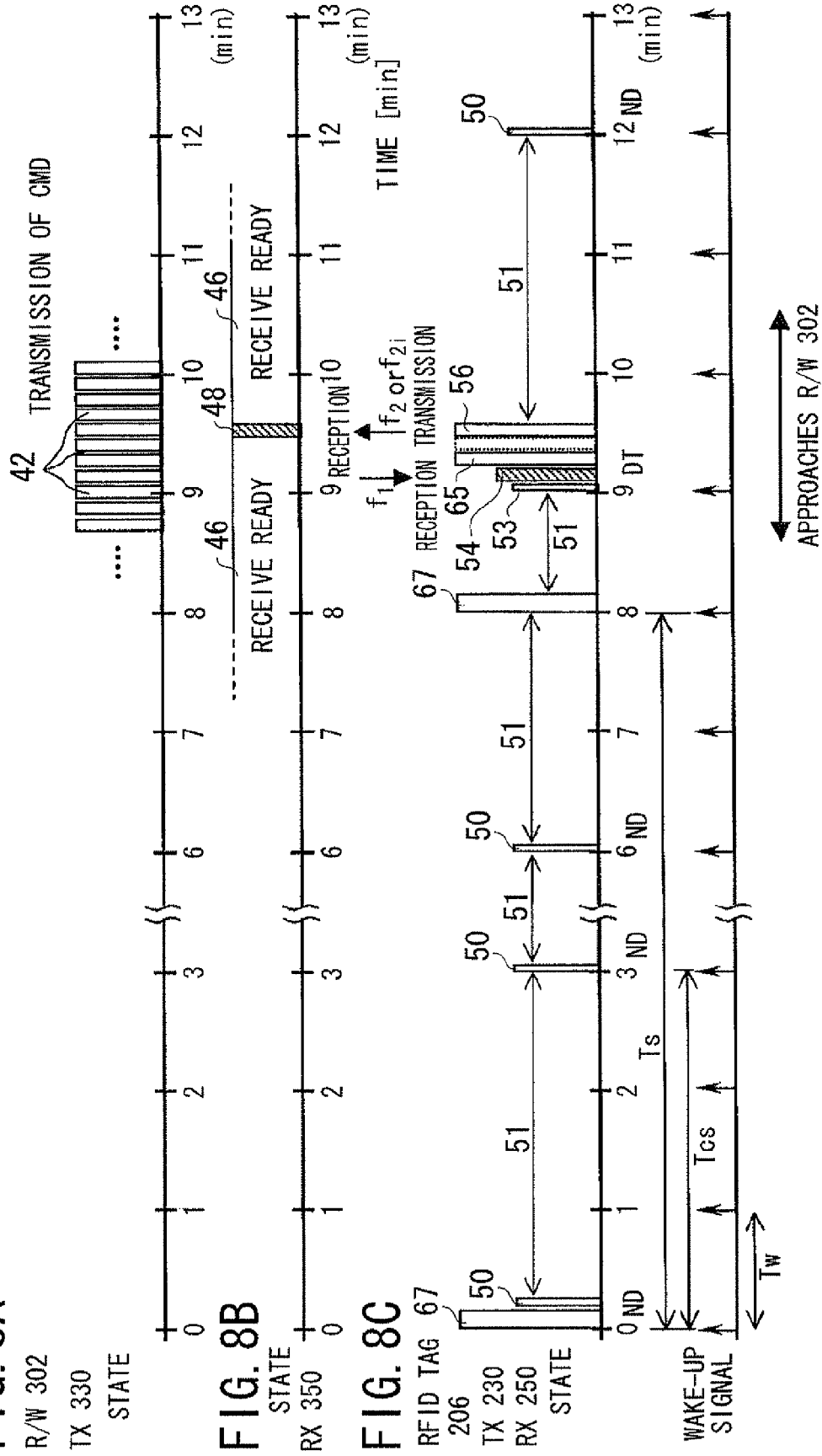

FIG. 9A
CONFIGURATION OF FRAME

ID REQUEST COMMAND

| START BYTE | ID REQUEST COMMAND | DATA LENGTH | DATA | END BYTE | CHECK BYTE |
|---|---|---|---|---|---|
| (1Byte) | (1Byte) | (1Byte) | | (1Byte) | (1Byte) |

FIG. 9B

DETECTED VALUE DATA READ REQUEST COMMAND

| START BYTE | READ REQUEST COMMAND | DATA LENGTH | DATA | END BYTE | CHECK BYTE |
|---|---|---|---|---|---|
| (1Byte) | (1Byte) | (1Byte) | | (1Byte) | (1Byte) |

FIG. 9C

PERIOD SETTING REQUEST COMMAND

| START BYTE | PERIOD SETTING COMMAND | DATA LENGTH | CS PERIOD | S PERIOD | DATA | END BYTE | CHECK BYTE |
|---|---|---|---|---|---|---|---|
| (1Byte) | (1Byte) | (1Byte) | (1Byte) | (1Byte) | | (1Byte) | (1Byte) |

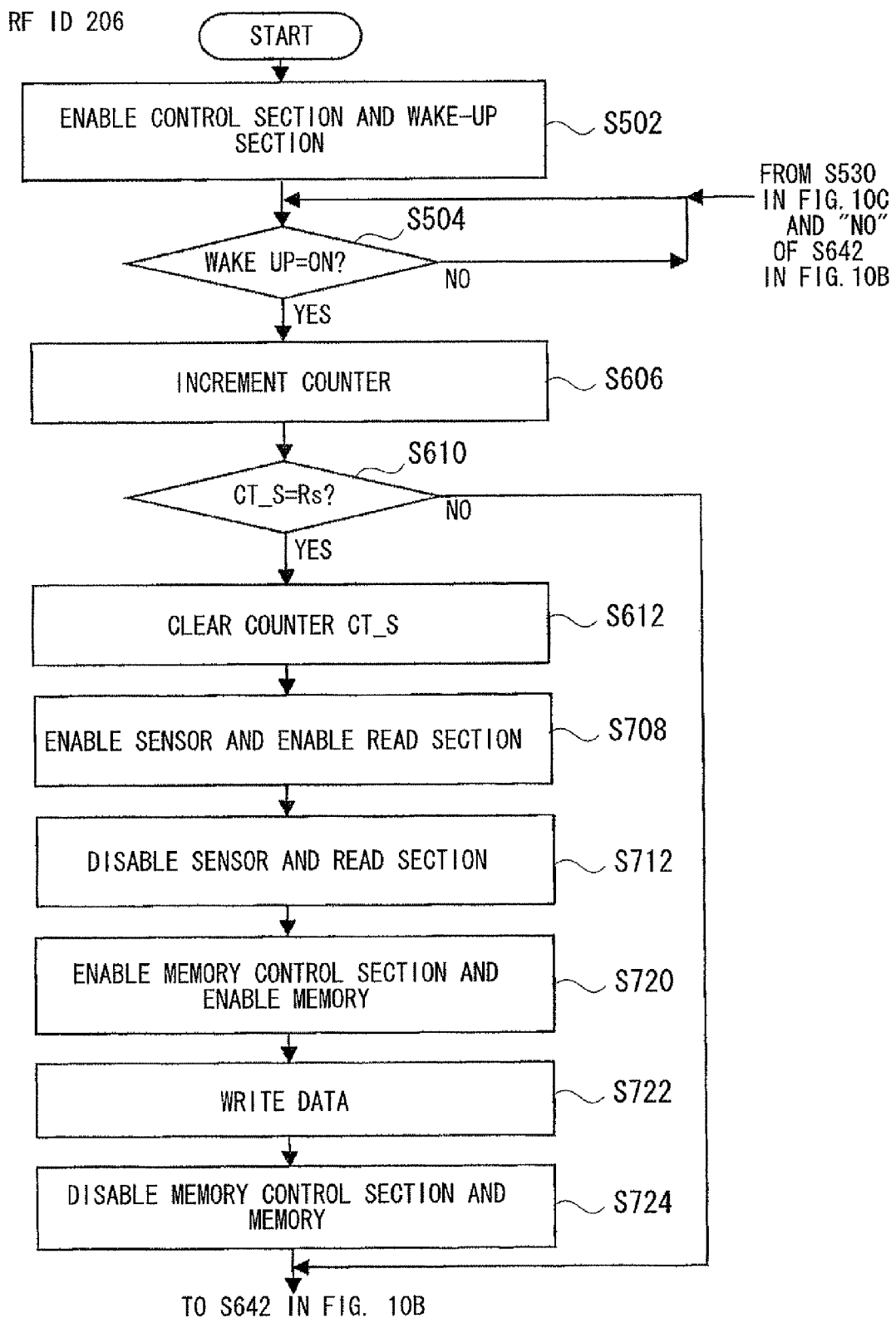

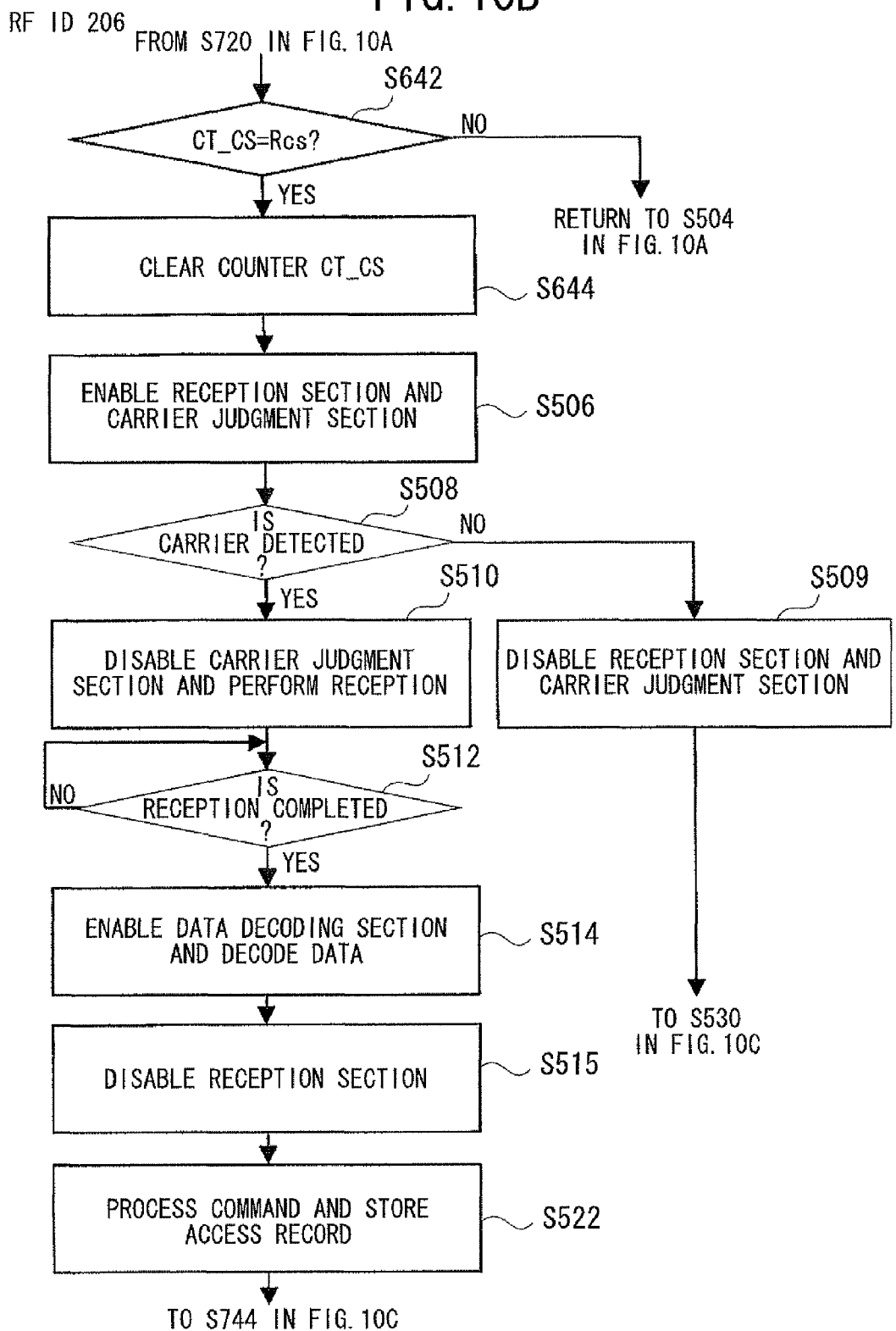

FIG. 12

| COUNTED NUMBER OF R/W IDs IN 60 sec | CARRIER SENSING PERIOD Tcs | PHYSICAL QUANTITY DETECTION PERIOD Ts | POSSIBILITY THAT R/W IS NEAR |
|---|---|---|---|
| 0 | 10 sec | 15 min | LOW |
| 1~9 | 5 sec | 15 min | MEDIUM |
| 10 OR GREATER | 1 sec | NONE (INFINITY) | HIGH |

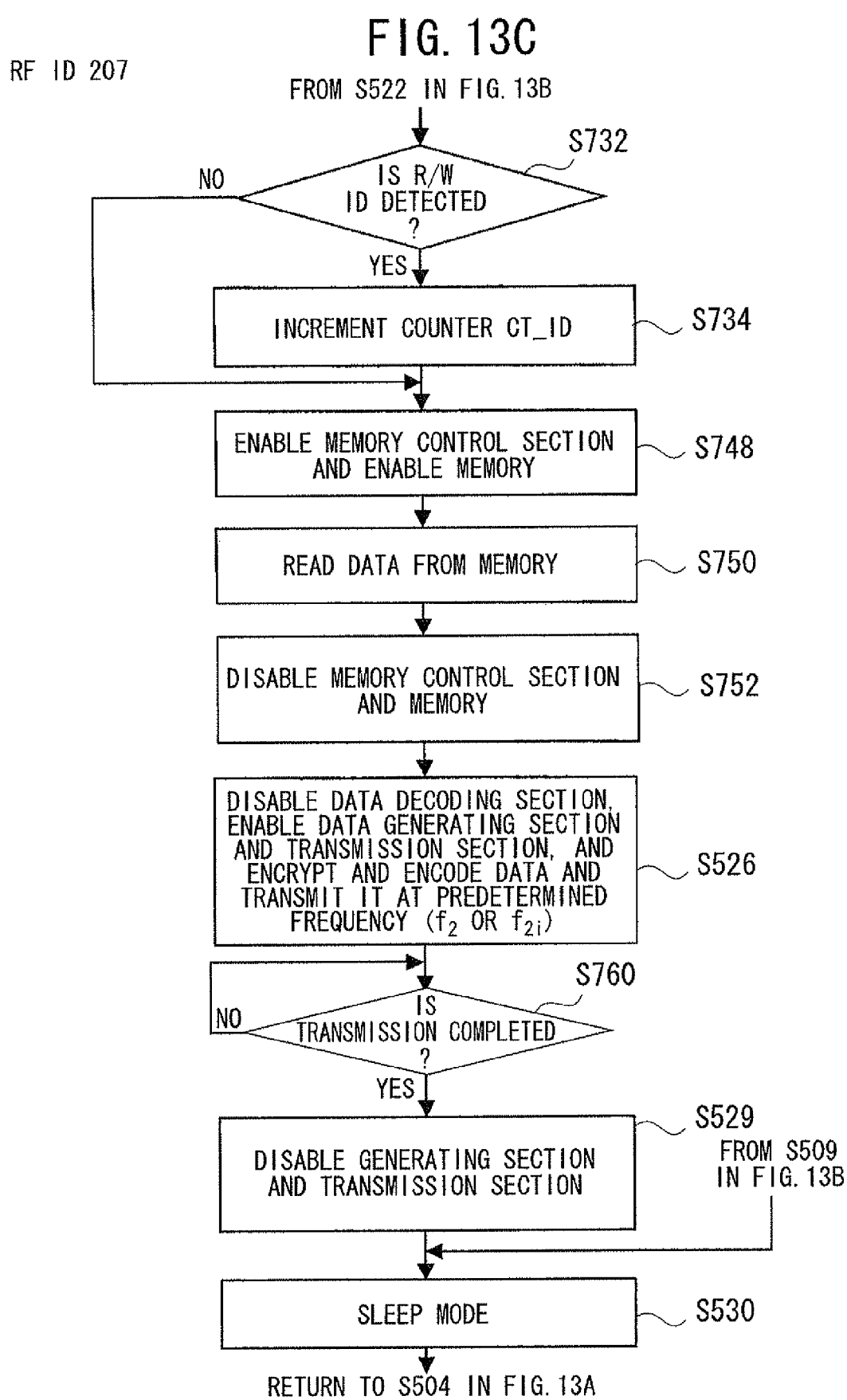

FIG. 15

| TIME OF DAY | CARRIER SENSING PERIOD Tcs | PHYSICAL QUANTITY DETECTION PERIOD Ts | ACCESS FREQUENTNESS FROM R/W |
|---|---|---|---|
| 22:00:00~07:00:00 | 10 sec | 15 min | MIDNIGHT TO EARLY MORNING, LOW FREQUENTNESS |
| 12:00:00~13:00:00 17:00:00~22:00:00 | 5 sec | 15 min | LUNCH BREAK AND AFTER-HOUR WORKING TIME ZONE, LOW ACCESS FREQUENTNESS |
| 07:00:00~12:00:00 13:00:00~17:00:00 | 1 sec | NONE | NORMAL OFFICE HOUR ZONE, HIGH FREQUENTNESS |

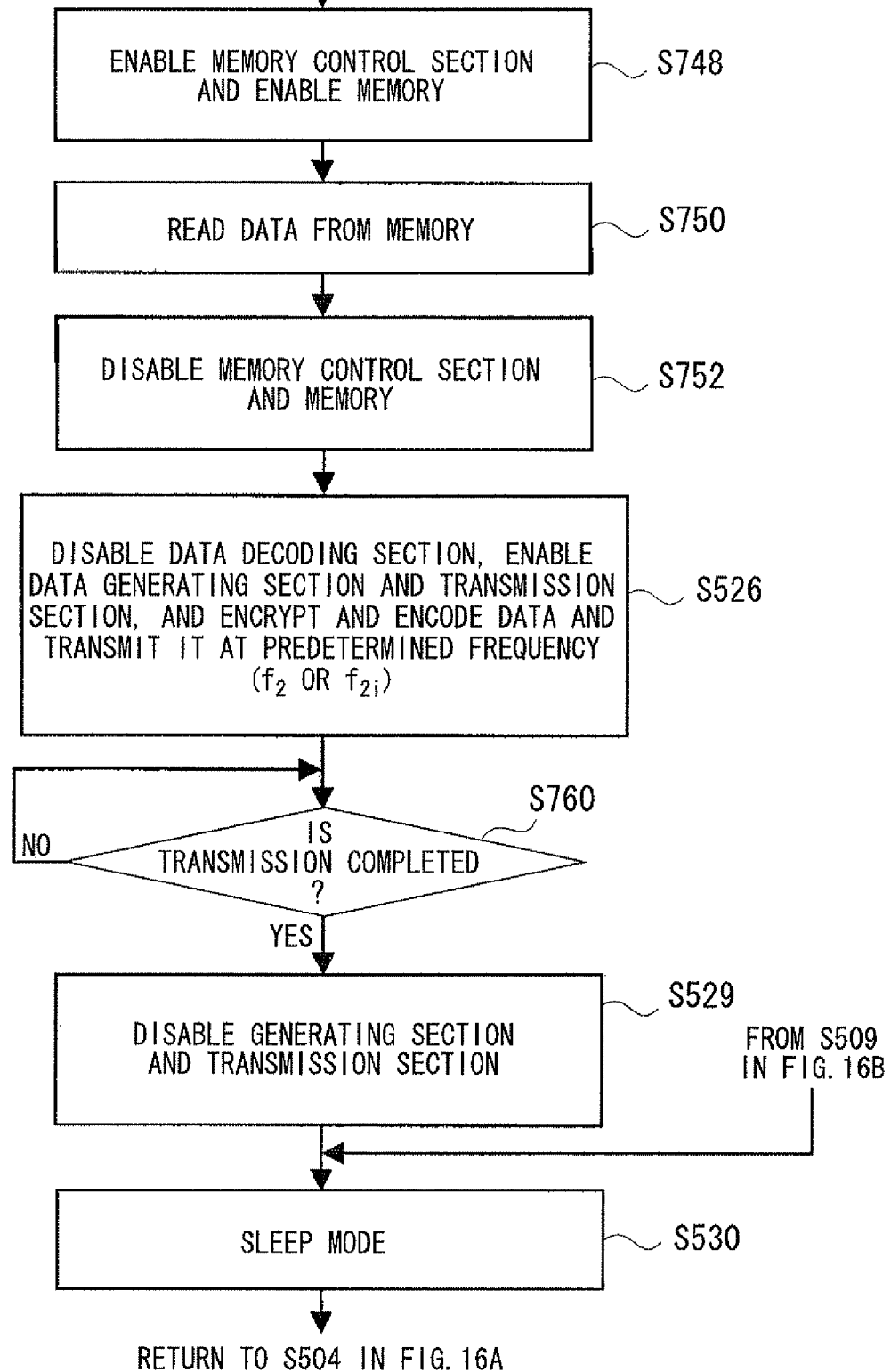

INFORMATION DEVICE CAPABLE OF PERFORMING WIRELESS COMMUNICATION WITH READER/WRITER DEVICE, PROGRAM, AND METHOD

CROSS-REFERENCE TO RELATED APPLICATIONS

This application is related to and claims priority to Japanese Application No. 2007-262143, filed Oct. 5, 2007, in the Japan Intellectual Property Office, the disclosure of which is incorporated herein by reference.

BACKGROUND

1. Field

The embodiments discussed herein are directed to a contactless information storage device of active type capable of reading and writing information in a contactless manner and, in particular, to an RFID tag or a contactless IC card of active type and of low power consumption that has a sensor and accumulates detected values from the sensor.

2. Description of the Related Art

An RFID tag of active type, that is, of battery-powered type, is attached to a product or the like or carried by a person, and then transmits an RF signal at a predetermined frequency that carries an ID and information concerning the product or the person. This RF signal is read by a reader device.

The read information is further processed by a computer and the like. Then, the distribution of the product or the action of the person can be monitored and managed.

The active-type RFID tag powered by a battery has a rather long communication-reachable distance and hence is practical in comparison with a passive-type RFID tag that receives electric power from a reader/writer device in a contactless manner.

Nevertheless, the active-type RFID tag transmits RF signals with a constant period, and hence has a risk of being tracked by a third party. This causes a problem in security.

As a security measure against this, an improved active-type RFID tag is known that responds only to a tag ID request from a reader/writer device.

When an active RFID tag that has a sensor for detecting a physical quantity in the surrounding environment and that accumulates the data of a plurality of such detected values is read by a reader/writer device, detected value data can be collected together with an ID.

Conventionally, an IC tag detection system of low power consumption includes a communication circuit; a control section; a power supply section for supplying electric power to these from a battery; and a time counter. The system further comprises: a plurality of IC tags which perform transmission at each predetermined setting time of day and in which their setting time of day is different from each other; and a detector for detecting the presence or absence of each tag based on communication with each tag. The detector has a communication circuit. Then, the presence or absence of receiving is determined successively at each setting time of day of each IC tag so that detection is performed.

Since no inquiry is performed from the detector, the IC tag can avoid useless reactions and battery exhaustion.

Conventionally, a method of realizing frequency locking does not require separate reference oscillators each in a transmitter in each of two nodes in a duplex link.

In a full duplex link, the carrier frequencies of transmitters are tuned by using information concerning a received frequency, so that the transmission frequencies of the two nodes in the link are locked simultaneously.

The offset in the carrier frequency of a first transmitter is detected as an offset in a corresponding second receiver.

The second receiver shifts the carrier frequency of the transmitter in accordance with the detected offset, and then notifies the detected offset to the first transmitter.

The carrier frequency of the transmitter is corrected in accordance with the offset detected in the first receiver.

Conventionally, a system monitors the pressure in a pneumatic tire of an automobile and transmitting a signal by wireless.

This system monitors the pressure or a pressure variation in a pneumatic tire of a wheel of an automobile and transmits a signal by wireless.

The system comprises: a receiver unit provided in the automobile and having at least one antenna; and a unit provided in a pneumatic tire and measuring, evaluating and transmitting a tire pressure signal.

When the pressure variation does not exceed a threshold, the transmitter unit does not transmit a pressure signal. Thus, electricity is saved.

Conventionally, a monitoring terminal device includes: a sensor section; and a transfer section having a wireless communication function of transmitting a sensor monitor output by wireless.

In the monitoring terminal device, the sensor and the wireless transmitter are operated intermittently. Thus, at the time of non-operating, electric power to the sensor section and the transfer section is turned OFF, and further the control processor is brought into a sleep state, so that power consumption is reduced.

Accordingly, even under an environment where electric power cannot be obtained from the outside, long-term operation is ensured.

Conventionally, in a tag system, a tag reader periodically transmits to an IC tag a beacon signal containing a command or an ID. The IC tag detects the command or the ID contained in the beacon signal received from the tag reader, then judges an operating condition based on the command or the ID, and then changes the own operation of the IC tag (e.g., an activation period).

By virtue of this, the probability of conflict of signals caused by an increase in the density of the IC tags is reduced. Further, the power consumption of the IC tag is reduced. Furthermore, when security service is necessary, rapid warning can be issued.

In the above-mentioned conventional system, regardless of the remaining power level of the battery, a signal is transmitted depending on whether the amount of variation in the measured value exceeds a threshold. Then, when the remaining battery power level goes insufficient, the system stops suddenly.

Further, for the purpose of reduce the power consumption, when the period of physical quantity detection and carrier sensing in the RFID tag is set to be longer so that the sleep duration is extended, the RFID tag cannot transmit back a response to a request command from an approached reader/writer device in a short time.

SUMMARY

It is an aspect of the embodiments discussed herein to provide a contactless information storage device, when the period of carrier sensing is set to be an optimal value independently of the period of physical quantity detection, the power consumption can be reduced and still a response can be transmitted back to a request command from the reader/writer device in a short time.

According to an aspect of an embodiment a method for an information device, which is capable of communicating with a reader/writer device, the information device including a receiver that detects an information request signal transmitted from the reader/writer device, a transmitter that transmits a response signal to said reader/writer device, a detection data acquisition section that acquires detection data corresponding to a physical quantity or state from a sensor for detecting said physical quantity or state, and a detection data storage, comprises activating the detection data acquisition section at first time intervals, detecting data, and storing the detection data; and activating the receiver at second time intervals and, upon detecting an information request, activating the transmitter based on the stored detection data.

According to an aspect of an embodiment, an information device capable of performing wireless communication with a reader/writer device comprises: a reception section for detecting an information request signal transmitted from the reader/writer device; a transmission section for transmitting a response signal to the reader/writer device in response to the detection of an information request signal performed by the reception section; a detection data acquisition section for acquiring detection data corresponding to a physical quantity or state from a sensor for detecting the physical quantity or state; a detection data storage section for holding the detection data acquired by the detection data acquisition section; a first control section for activating the detection data acquisition section at first time intervals and inputting the detection data from the detection data acquisition section into the detection data storage section; and a second control section for activating the reception section at second time intervals and, when an information request signal is detected by the reception section, activating the transmission section based on the detection data held in the detection data storage section.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 illustrates a configuration of an active-type RFID tag serving as an active-type contactless information storage device and of a reader/writer device.

FIG. 2A illustrates a time chart of transmission processing for an RF signal that carries a tag information request command in a reader/writer device.

FIG. 2B illustrates a time chart of a receive ready state and receiving RF signal reception processing in a reader/writer device 2.

FIG. 2C illustrates a time chart of carrier sensing, receiving RF signal reception processing, and transmission processing for an RF signal that carries a response in case of successful authentication in an active-type RFID tag.

FIG. 3 illustrates a flow chart of processing executed by a reader/writer device.

FIGS. 4A and 4B illustrate processing executed by an active-type RFID tag.

FIG. 8A illustrates a time chart of transmission processing for an RF signal that carries data containing a tag ID request or information request command in a reader/writer device.

FIG. 8B illustrates a time chart of a receive ready state and receiving RF signal reception processing in a reader/writer device.

FIG. 8C illustrates a time chart of carrier sensing, physical quantity detection, read of detected value data and write into a memory, receiving RF signal reception processing, read of the accumulated detection value data from the memory, and transmission processing for an RF signal that carries data containing tag information such as a tag ID and a response in an active-type RFID tag.

FIGS. 9A, 9B, and 9C each illustrate an example of a configuration of a frame containing a diverse command transmitted by a reader/writer device.

FIGS. 10A, 10B, and 10C illustrate processing executed by an active-type RFID tag in FIG. 7.

FIG. 12 illustrates a table indicating a relation between: the counted number of IDs received from a reader/writer device by an RFID tag in a time duration of one period; the value of carrier sensing period; and the value of physical quantity detection period.

FIGS. 13A, 13B, and 13C illustrate processing executed by an active-type RFID tag.

FIG. 15 illustrates a table indicating a relation between: the time zone; the value of carrier sensing period; and the value of physical quantity detection period.

FIGS. 16A, 16B, and 16C illustrate processing executed by an active-type RFID tag.

DETAILED DESCRIPTION OF THE EMBODIMENTS

Figure 4A:
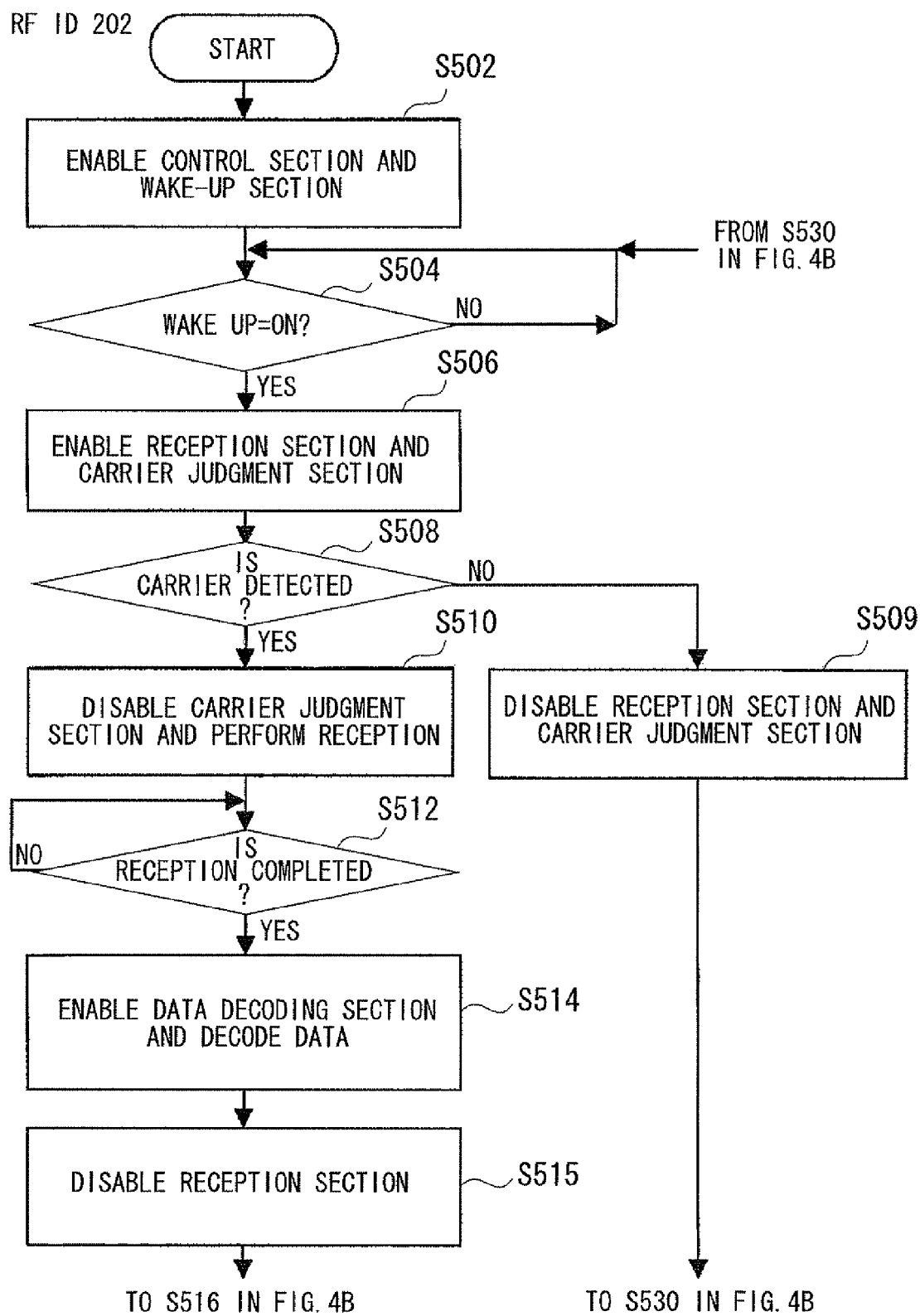

Non-restrictive embodiments of the present invention are described below with reference to the drawings.

In the drawings, like components are designated by like reference numerals.

FIG. 1 illustrates a configuration of an active-type RFID tag 202 serving as an active-type contactless information storage device and of a reader/writer device 302.

As the active-type contactless information storage device, a contactless IC card having a configuration similar to that of the active-type RFID tag 202 may be employed in place of the active-type RFID tag 202.

In this example, transmission data is encrypted between the RFID tag 202 and the reader/writer device 302, and then received data is decrypted and used for authentication.

Alternatively, authentication may be omitted. Further, transmission data need not be encrypted.

The active-type RFID tag 202 includes has a control section 210, a memory 214, a data generating section 222, a transmission section (TX) 230, a reception section (RX) 250, a data decoding section 242, a carrier judgment section 246, a wakeup section 270, a transmission antenna (ANT) 282, a reception antenna (ANT) 284, and a battery 290.

The data generating section 222 may encrypt data such as a tag ID (ID_tag) stored in the memory 214, and then encodes the encrypted data so as to generate encoded data.

The transmission section (TX) 230 modulates a carrier with the encoded data of a baseband received from the data generating section 222, and then transmits an RF signal at a frequency f2 or at frequencies f2$i$ (n=1, 2, ... n) different from each other.

The reception section (RX) 250 receives and demodulates an RF signal at a frequency f1 so as to generate baseband encoded data, and then may generate data indicating the carrier intensity of the received RF signal.

The data decoding section 242 decodes the encoded data received from the reception section 250, and then decrypts the decoded data so as to generate decrypted data.

Based on the above-mentioned data indicating the carrier intensity, the carrier judgment section 246 judges the presence or absence of a carrier of received RF signal.

The wakeup section 270 may generate a wakeup signal in accordance with a time control sequence set up in advance.

The frequencies f1 and f2 are, for example, 300 MHz and 301 MHz, respectively.

The frequencies f2$i$ are, for example, 301 MHz, 302 MHz, ... , 305 MHz.

The transmission output power of the transmission section (TX) 230 is, for example, 1 mW.

The transmission antenna (ANT) 282 may be linked to the transmission section 230.

The reception antenna (ANT) 284 may be linked to the reception section 250.

Alternatively, the antennas 282 and 284 may be a single antenna.

The control section 210 includes a random number generating section 211, a frequency switching section 212, and a timing adjustment section 213.

The random number generating section 211 may generate a random number used for selecting a transmission time slot at random.

The frequency switching section 212 switches the transmission frequency f2$i$.

The timing adjustment section 213 adjusts the transmit timing.

The battery 290 supplies electric power to the individual components 210 to 270 and the like.

The control section 210 is always in an active state after the power-ON, and provides a memory control signal CTRL_M, a data generation control signal CTRL_ENC, a transmission control signal CTRL_TX, a reception control signal CTRL_RX, a data decryption control signal CTRL_DEC, a carrier judgment control signal CTRL_CS, and a wakeup section control signal to the memory 214, the data generating section 222, the transmission section 230, the reception section 250, the data decoding section 242, the carrier judgment section 246, and the wakeup section 270, respectively.

The control section 210 may include a microprocessor or a microcomputer that operates in accordance with a program.

The memory 214 stores information such as: the tag ID (ID_tag) of the RFID tag 202; a system ID (ID_system) and an encryption/decryption key Ke for authentication; the present time T; a record of access by the reader/writer device 302; a control schedule and a time control sequence for the wakeup section 270; the present remaining power level of the battery 290; a carrier sensing period Tcs; a reception processing duration time; a transmission period Tt; and a transmission duration time.

These information pieces are transmitted in advance to the RFID tag 202 by the reader/writer device 302, and then written in advance into the memory 214 by the control section 210.

These information pieces in the memory 214 are stored and updated under the control of the control section 210.

The memory 214 provides the present time T, the system ID, and the encryption/decryption key Ke to the data generating section 222 and the data decoding section 242.

The system ID indicates a common ID shared by an individual group including of the reader/writer device 302 and a plurality of RFID tags such as the RFID tag 202.

The system ID may be the ID of the reader/writer device 302.

The data generating section 222 includes an encryption section 224 for encrypting transmission data in accordance with a predetermined cryptosystem by using the encryption key Ke stored in the memory 214.

The data decoding section 242 includes a decryption section 244 for decrypting received data in accordance with a predetermined cryptosystem by using the encryption/decryption key Ke.

The present example is described for a case that the predetermined cryptosystem is a common key cryptosystem. However, a public key cryptosystem may be employed.

The wakeup section 270 includes a timer 274 for measuring time and may generate time-of-day information. The wakeup section 270 is always in an active state after the power-ON of the RFID tag 202, and provides to the control section 210 a wakeup signal (Wakeup) with a predetermined carrier sensing period Tcs of, for example, 2 seconds in accordance with the time of day held in the timer 274 and the control schedule and the time control sequence which are set up in advance and read from the memory 214.

The control section 210 corrects the time of day in the timer 274 based on the time T of day in the memory 214, and then writes the present time T generated by the timer 274 into the memory 214 so as to update it.

The data generating section 222 may generate data that contains the tag ID (ID_tag) and the like stored in the memory 214 and that has a predetermined format. Then, the data generating section 222 encrypts the data in accordance with a predetermined cryptosystem, then encodes it in accordance with a predetermined encoding system, and then provides it to the transmission section 230.

The data may include the battery remaining power level and the access record.

The data decoding section 242 decodes the received encoded data in accordance with a predetermined encoding system, then decrypts the decoded data in accordance with a predetermined cryptosystem, and then provides the decrypted data to the data generating section 222 and the control section 210.

The carrier judgment section 246 receives from the reception section 250 the data indicating the intensity of electric power of the receiving RF signal carrier, then judges the presence or absence of carrier reception, and then provides the judgment result to the control section 210.

The reader/writer device 302 has a control section 310, a memory 314, a data generating section 322, a transmission section (TX) 330, a reception section (RX) 350, a data decoding section 342, a timer 374, a transmission antenna (ANT) 382, and a reception antenna (ANT) 384.

The control section 310 transmits and receives data to and from a host computer (not shown).

The data generating section 322 may generate data that contains a command (CMD) and the like received from the control section 310 and that has a predetermined format. Then, the data generating section 322 encrypts the data, and then encodes the encrypted data so as to generate encoded data.

The transmission section (TX) 330 modulates a carrier with the baseband encoded data received from the data generating section 322, and then transmits an RF signal at a frequency f1.

The transmission output power of the transmission section (TX) 330 is, for example, 100 mW.

The reception section (RX) 350 receives an RF signal at a frequency f2 or f21 to f2n.

The data decoding section 342 decodes the received data received from the reception section 350, then decrypts the decoded data so as to generate baseband decrypted data, and then provides the decrypted data to the control section 310.

The timer 374 measures time and may generate time-of-day information,

The transmission antenna (ANT) 382 may be linked to the transmission section 330.

The reception antenna (ANT) 384 may be linked to the reception section 350.

As substitute constitution, the antennas 382 and 384 may be a single antenna.

The memory 314 of the reader/writer device 302 stores: the present time T for authentication; the system ID (ID_system) for authentication; and the encryption/decryption key Ke.

The data generating section 322 has an encryption section 324 for encrypting transmission data in accordance with a predetermined cryptosystem by using the encryption key Ke stored in the memory 314.

The data decoding section 342 includes a decryption section 344 for decrypting received data in accordance with a predetermined cryptosystem by using the encryption/decryption key Ke.

When a command such as a request command for a tag ID or tag information (simply referred to as a tag information request command, hereinafter) is received from the host computer, the control section 310 provides data containing this command to the data generating section 322.

The data may include: a transmission frequency f2 or f2i to be used by the RFID tag 202; the present time T serving as a reference; and new or updated control schedule and time control sequence.

Together with the present time T, this command may contain a command that instructs correction or update of the time of day held in the timer 274.

Together with the new or updated control schedule or time control sequence, this command may contain a command that instructs correction or update of the schedule or sequence stored in the memory 214.

FIG. 2A illustrates a time chart of transmission processing 42 for an RF signal that carries a tag information request command (CMD) in the reader/writer device 302.

FIG. 2B illustrates a time chart of a receive ready state 46 and receiving RF signal reception processing 48 in the reader/writer device 302.

FIG. 2C illustrates a time chart of carrier sensing 50, 52, and 53, receiving RF signal reception processing 54 and 55, and transmission processing 56 for an RF signal that carries a response in case of successful authentication in an active-type RFID tag 202.

Referring to FIG. 2A, the data generating section 322 of the reader/writer device 302 may generate data containing a tag information request command to an RFID tag received from the control section 310. Then, the data generating section 322 encrypts the data, and then encodes the encrypted data so as to generate encoded encrypted data.

In each of successive time slots in the transmission processing 42, the transmission section 330 transmits an RF signal carrying the command periodically at short intervals.

Referring to FIG. 2C, in the active-type RFID tag 202, the reception section 250 and the carrier judgment section 246 are enabled (activated) by the control section 210 in the durations of carrier sensing 50 and 52 generated as predetermined durations of, for example, approximately 1 ms to 10 ms with a constant period Tcs of, for example, 2 seconds in accordance with a wakeup signal from the wakeup section 274.

Thus, the reception section 250 goes into a receive ready state, while the carrier judgment section 246 judges the presence or absence of carrier reception in accordance with the data indicating the intensity of receiving RF signal carrier power from the reception section 250.

When the RFID tag 202 is not located near the reader/writer device 302, the carrier judgment section 246 does not detect a carrier (ND), and hence concludes the absence of a carrier.

In each duration 51 between carrier sensing durations 50, the RFID tag 202 is in a sleep mode, while only the control section 210 and the wakeup section 270 are in an enabled or powered-ON (energized) state. The other components 214 to 250 are in a disabled (deactivated) or powered-down (de-energized) state.

The time length of the sleep duration 51 may be shorter than the time length between the end time of a carrier sensing duration 50 and the start time of the next carrier sensing duration 50.

When the RFID tag 202 approached the reader/writer device 302 so that the reception section 250 of the RFID tag 202 receives an RF signal, the carrier judgment section 246 detects a carrier of the RF signal in the duration of carrier sensing 52 (DT), and hence concludes the presence of a carrier.

In response to the judgment indicating the presence of a carrier, the reception section 250 and the data decoding section 242 are enabled in a predetermined duration (e.g., 100 ms) within the duration of the next reception processing 54.

The reception section 250 receives and demodulates the RF signal so as to generate encoded encrypted data containing a command. The data decoding section 242 decodes the data, then decrypts the encrypted data, then extract a command, and then provides the command to the control section 210.

The control section 210 performs authentication processing on the reader/writer device 302 by using the time T of day and the system ID contained in the command.

When the authentication is successful, in response to the command, the control section 210 enables the data generating section 222 and the transmission section 230 during a predetermined duration (e.g., 100 ms) in a duration of transmission processing 56 selected at random within a predetermined duration.

The data generating section 222 may encrypt data including necessary information such as the tag ID extracted from the memory 214 (ID_tag), the time T of day, and the system ID (ID_system), and then encodes the encrypted data.

This necessary information may include information concerning, for example: the contents, the number, and the state of products in a package; the sender; the movement; the transit; and the destination.

The transmission section 230 modulates a carrier with the response data containing the encrypted tag ID, and then transmits an RF signal.

In contrast, when the authentication is unsuccessful, the processing is terminated without generation and transmission of data.

Referring to FIG. 2B, the reception section 350 of the reader/writer device 302 is always in a receive ready state 46. Thus, when the RFID tag 202 approaches it so that an RF signal is received, the reception section 350 demodulates the receiving RF signal so as to generate an encoded encrypted data in the duration time of reception processing 48.

The data decoding section 342 decodes the encoded encrypted data, then decrypts the decoded encrypted data so as to reproduce the response data containing the tag ID, and then provides the reproduced response to the control section 310.

Based on the received and reproduced response, the control section 310 authenticates the RFID tag 202 by using the time T of day and the system ID contained in the response, and then provides the tag ID to the host computer.

The host computer processes the tag ID and uses it for monitoring and managing the product distribution or the person.

In general, the time duration in which the RFID tag 202 is not located near the reader/writer device 302 is much longer than the time duration in which the tag is located near the device.

Thus, according to the above-mentioned configuration, in a major part of time duration, the active-type RFID tag 202 is in a sleep mode.

This remarkably reduces the power consumption in the active-type RFID tag 202, and hence remarkably extends the operating time of the battery 290.

Further, in general, the reader/writer device 302 and the RFID tag 202 encrypt transmission data and perform mutual authentication using the time T of day and the system ID. This avoids a risk of unauthorized use of data even in a case that data transmitted from the reader/writer device 302 and the RFID tag 202 is intercepted by a third party.

Thus, security is improved in the reader/writer device 302 and the RFID tag 202.

FIG. 3 illustrates processing executed by the reader/writer device 302.

FIGS. 4A and 4B illustrate processing executed by the active-type RFID tag 202.

Referring to FIG. 3, at Operation S402, the control section 310 of the reader/writer device 302 judges the presence or absence of a tag ID request received from the host computer.

This Operation S402 is repeated until a tag ID request is received.

When the presence of a tag ID request is concluded, the procedure goes to Operation S414 for transmission processing and Operation S422 for reception processing.

At Operation S414, the control section 310 provides the tag information request command and related information to the data generating section 322.

The data generating section 322 may encrypt data containing the tag information request command received from the control section 31 0, the present time T and the system ID (ID_system) extracted from the memory 314, and the ID of the reader/writer device 302 in accordance with a predetermined cryptosystem such as DES (Data Description Standard), Triple DES, and AES (Advanced Encryption Standard) by using the encryption key Ke extracted from the memory 314. Then, the data generating section 322 encodes the encrypted data in accordance with a predetermined encoding system such as an NRZ (Non Return to Zero) encoding method or a Manchester encoding method. Then, the transmission section 330 modulates a carrier with the encoded data and then transmits an RF signal at a frequency f1 in the duration of transmission processing 42 in FIG. 2A.

The control section 310 may incorporate into the tag information request command: data that specifies a transmission frequency f2 or a variable transmission frequency f2$i$ for the response to the command; data that indicates time of day or a time slot in which the variable transmission frequency f2$i$ is to be used; data indicating the present time T; and a control schedule and a time control sequence.

The reader/writer device 302 may change the frequency f2$i$ for each of a plurality of commands in a plurality of transmission periods tRW-CY (e.g., for a plurality of commands in the transmission periods tRW-CY in a number for at least one carrier sensing period.

By virtue of this, even when a plurality of RFID tags are simultaneously located near the device, the probability is reduced that the response transmission from the RFID tags conflict with each other. This increases the number of RFID tags that can simultaneously be identified by the reader/writer device 302.

At Operation S418, the control section 210 judges whether the data transmission is to be terminated.

When it is judged as being to be terminated, the procedure exits this routine.

When it is judged that the data transmission is to be continued, the procedure returns to Operation S414.

In FIG. 2A, data transmission is continued repeatedly.

Referring to FIG. 4A, at Operation S502, when the RFID tag 202 is activated, the control section 210 and the wakeup section 270 are enabled.

Once the RFID tag 202 is activated, the control section 210 and the wakeup section 270 are always enabled and hence in an active state.

In accordance with the timer 274 and the time control sequence, the wakeup section 270 provides to the control section 210 a wakeup signal that indicates the timing of performing carrier sensing for a receiving RF signal with a predetermined period Tcs.

At Operation S504, the control section 210 judges whether the wakeup signal received from the wakeup section 270 indicates an ON state.

The control section 210 repeats the Operation S504 until the wakeup signal goes ON.

When it is judged at Operation S504 that the wakeup signal indicates an ON state, the control section 210 at Operation S506 enables the reception section 250 and the carrier judgment section 246 for a short duration of, for example, approximately 1 ms to 10 ms.

The reception section 250 goes into a receive ready state for an RF signal. Based on the data indicating the carrier reception power received from the reception section 250, the carrier judgment section 246 judges the presence of a carrier of receiving RF signal, and then provides the judgment result to the control section 210.

At Operation S508, in accordance with the judgment result, the control section 210 judges whether a carrier has been detected.

When it is judged that no carrier is detected, the control section 210 at Operation S509 disables (inactivates) the reception section 250 and the carrier judgment section 246.

Then, the procedure goes to Operation S530.

When it is judged at Operation S508 that a carrier is detected, the control section 210 at Operation S510 disables the carrier judgment section 246. Further, in a predetermined duration of, for example, 100 ms to 200 ms, in a state that the reception section 250 is enabled, the control section 210 receives an RF signal at a frequency f1 that carries a command from the reader/writer device 302 (reception 54 in FIG. 2C), and then demodulates the received RF signal.

At Operation S512, the control section 210 judges whether the reception of the RF signal by the reception section 250 has been completed.

Operation S512 is repeated until the reception of the RF signal is completed.

When it is judged at Operation S512 that the reception of the RF signal has been completed, the control section 210 at Operation S514 enables the data decoding section 242.

Under the control of the control section 210, the data decoding section 242 receives the receiving data from the reception section 250, and then decodes the data in accordance with a predetermined encoding system.

At Operation S515, the control section 210 disables the reception section 250.

Referring to FIG. 4B, at Operation S516, under the control of the control section 210, the data decoding section 242 decrypts the decoded data in accordance with a predetermined cryptosystem by using the encryption/decryption key Ke extracted from the memory 214, and then provides to the control section 210 the data containing the command, the tag ID (ID_tag), the time T of day, and the system ID (ID_system) which have been decrypted.

The data may contain a control schedule and a time control sequence.

After receiving the data, the control section 210 compares the decrypted time T of day and the decrypted system ID with the time T of day and the system ID stored in the memory 214 so as to judge whether these agree with each other, so that authentication is performed on the reader/writer device 302.

At Operation S518, the control section 210 judges whether the authentication is successful.

When it is judged that the authentication is unsuccessful, the control section 210 at Operation S520 disables the data decoding section 242.

Then, the procedure goes to Operation S530.

When it is judged at Operation S518 that the authentication is successful, the control section 210 at Operation S522 receives from the data decoding section 242 the decrypted data containing the tag information request command, then processes the decrypted received command contained in the decrypted data, and then stores into the memory 214 the record of access by the reader/writer device 302.

At Operation S522, the control section 210 receives from the data decoding section 242 the decoded data containing the tag information request command, then processes the received command contained in the decoded data, and then stores into the memory 214 the record of access by the reader/writer device 302.

When a time correction command and the present time T are contained in the received data, the control section 210 corrects or updates to be the time T the time of day held in the timer 274 of the wakeup section 270.

At Operation S526, in accordance with the tag information request command, the control section 210 enables the data generating section 222 and the transmission section 230 in one time slot selected at random from a predetermined number of time slots within a predetermined duration.

The selected time slot is the duration of transmission processing 56 in FIG. 2C.

The data generating section 222 may encrypt data containing: the tag ID of RFID tag 202 (ID_tag), the time T of day, the system ID (ID_system) which are read from the memory 214; and the ID of the reader/writer device 302, in accordance with a predetermined cryptosystem by using the encryption key Ke, then encodes the encrypted data in accordance with a predetermined encoding system, and then provides it to the transmission section 230.

The transmission section 230 modulates a carrier with the encoded encrypted data, and then transmits an RF signal at a frequency f2 or f2$i$ through the antenna 284 (transmission 56 in FIG. 2C).

Switch of the frequency f2$i$ is performed by the frequency switching section 212 of the control section 210.

The timing adjustment section 213 adjusts the periods of a plurality of time slots to be a predetermined value.

At Operation S529, the control section 210 disables the data generating section 222 and the transmission section 230.

At Operation S530, the control section 210 brings the RFID tag 202 into a sleep mode.

In a sleep mode, basically, only the control section 210 and the wakeup section 270 are in an enabled state, while the other components 214 to 250 are in a disabled state.

Referring to FIG. 3 again, at Operation S422, the control section 310 enables and brings the reception section 350 into a receive ready state.

The reception section 350 awaits reception of an RF signal at a frequency f2 (receive ready 46), and receives an RF signal (reception processing 48).

At Operation S424, the control section 310 judges whether the reception section 350 has been completed the reception of the RF signal.

Operations S422 to S424 are repeated until the reception of the RF signal is completed.

When it is judged that the receiving has been completed, the procedure goes to Operation S428.

At Operation S428, the reception section 350 provides the received data to the data decoding section 342.

The data decoding section 342 decodes the received data in accordance with a predetermined encoding system, then decrypts the decoded data in accordance with a predetermined cryptosystem, and then provides the judgment result indicating reception and the decrypted data to the control section 210.

The control section 310 compares the decrypted time T of day and the decrypted system ID with the time T of day and the system ID stored in the memory 314 so as to judge whether they agree with each other, so that authentication is performed on the RFID tag 202.

In the control section 210 of the RFID tag 202 and in the control section 310 of the reader/writer device 302, even when an error within a predetermined limit (e.g., ±0.5 second) is present between the received time T of day and the stored time T of day, they may be concluded as agreeing with each other.

At Operation S430, the control section 310 judges whether the authentication is successful.

When it is judged that the authentication is unsuccessful, the procedure returns to Operation S422.

When it is judged that the authentication is successful, the procedure goes to Operation S432.

At Operation S432, the control section 310 transmits the decoded data to the host computer.

At Operation S436, the control section 310 judges whether the data reception ready is to be terminated.

When it is judged as being to be terminated, the procedure exits this routine.

When it is judged that the data reception ready is to be continued, the procedure returns to Operation S422.

In FIG. 2B, the data reception ready is continued repeatedly.

As such, the reader/writer device 302 transmits an RF signal periodically at short intervals, and is always in an RF signal receive ready state. This remarkably reduces the carrier sensing time of the RFID tag 202.

Thus, for example, like in a case of entrance/exit management, in a case that transmission and reception are performed only several times per day and that the major part of operating time is used for carrier sensing, the overall power consumption in the RFID tag 202 is reduced remarkably.

The control schedule stored in the memory 214 may be specification of: holidays; a duration between a predetermined time of day and a predetermined time of day (e.g., from 6:00 pm to 6:00 am) which is the night of each weekday; and a duration between a predetermined time of day and a predetermined time of day (e.g., from 6:00 am to 6:00 pm) which is the daytime of each weekday.

In this case, the wakeup section 270 does not generate a wakeup signal on holidays and at night. Thus, the RFID tag 202 is in a sleep mode and hence does not perform carrier sensing at all. In contrast, in the daytime of each weekday, the RFID tag 202 performs carrier sensing with a predetermined period (e.g., 1 second).

Under the control of the control section 210, the wakeup section 270 may generate a wakeup signal in accordance with the battery 290 remaining power level P stored in the memory 214.

In this case, when the remaining battery power level P is sufficient, carrier sensing may be performed with a relatively short period (e.g., 1 second). When the remaining power level P goes below a threshold Pth, carrier sensing may be performed with a relatively long period (e.g., 2 seconds).

As described above, the record of access by the reader/writer device is stored in the memory 214. Thus, even in a case that unauthorized access is performed by a reader/writer device other than the reader/writer device 302, a log is recorded. Thus, when the access record is read by the reader/writer device 302 and then analyzed by the host computer the unauthorized access is detected.

The configuration and the operation of the active-type RFID tag 202 and the reader/writer device 302 are disclosed in Japanese Patent Application Laid-Open No. 2006-338489 (A) (corresponding to US2006/276206-A1). Thus, the entirety of this disclosure is incorporated herein by reference.

When an active-type RFID tag that has a sensor for detecting a physical value or state in the surrounding environment and that records the detected value is read by a reader/writer device, detected value data of the physical quantity or state can be collected together with a tag ID.

In a configuration that data is not recorded when the difference between the present and preceding measured values does not exceed a threshold, electric power necessary for data recording is reduced so that the operating time of the battery of the RFID tag is extended. Further, the required memory capacity is reduced.

In a case that a sensor is provided in association with the active-type RFID tag 202 in FIGS. 1 to 4B and that its detected value is recorded periodically, such a configuration is expected that: the wakeup section 270 may generate a wakeup signal with a predetermined period; in response to this, the sensor is enabled temporarily; and the data of detected value is stored periodically into the memory 214.

A large amount of detected value data stored into the memory 214 over a long term is later read by the reader/writer device 302.

Figure 5:
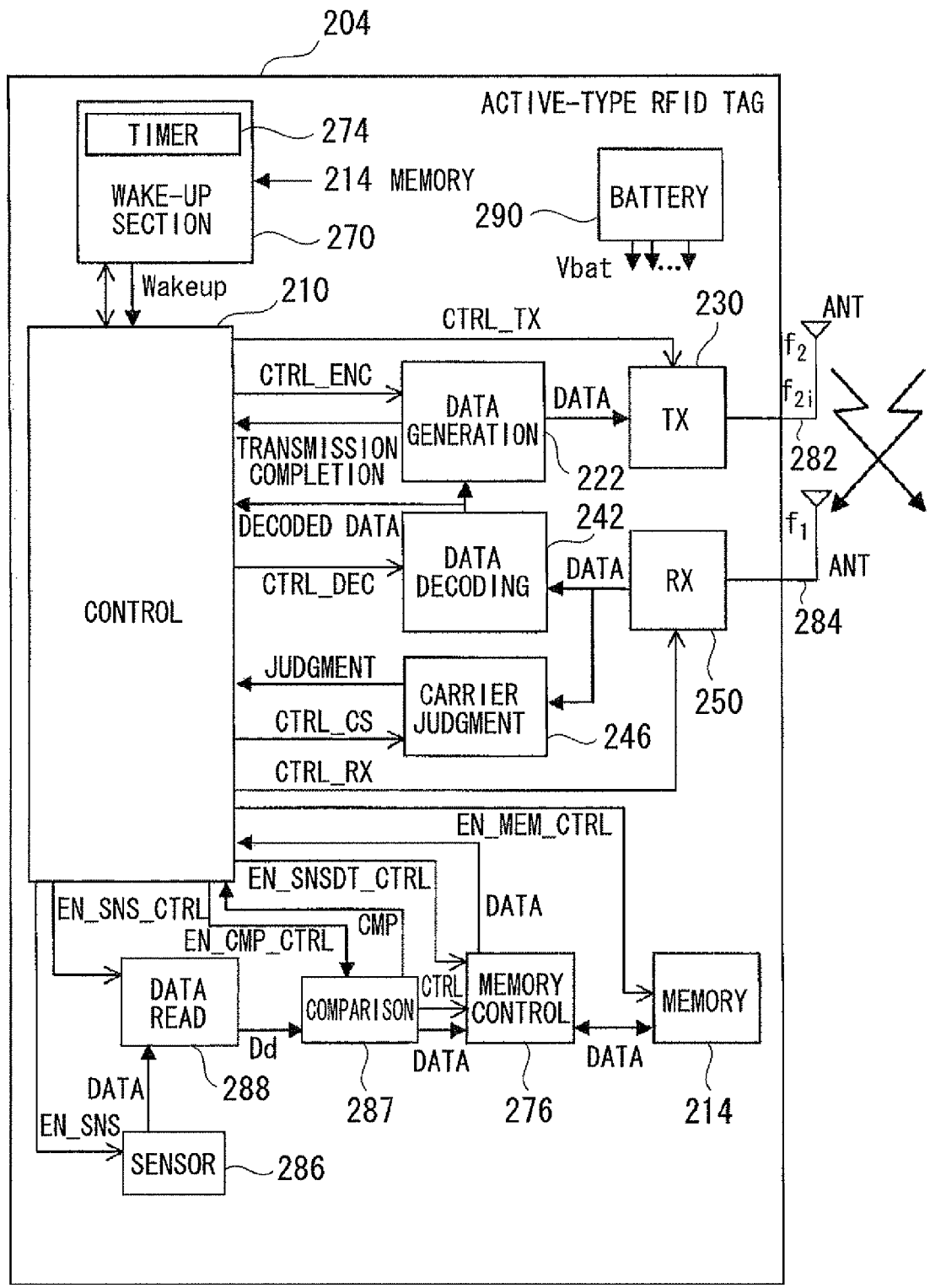
FIG. 5 illustrates a configuration of an active-type RFID tag serving as an active-type contactless information storage device modified such as to detect a physical quantity and accumulating the detected value data.

FIG. 5 illustrates a configuration of an active-type RFID tag 204 serving as an active-type contactless information storage device modified such as to detect a physical quantity and accumulating the detected value data.

The reader/writer device 302 in FIG. 1 may be used for the RFID tag 204.

In addition to the components 210 to 213, 222 to 274, 282, 284, and 290 of the RFID tag 202 in FIG. 1, the RFID tag 204 includes a memory control section 276; a sensor 286; a sensor data read section 288 for acquiring a detected value of the sensor 286 and then holding the data; and a comparison section 287.

The other points in the configuration of the RFID tag 204 are similar to those of the RFID tag 202 in FIG. 1.

The battery 290 supplies electric power to the components 210 to 276, 286, 288, 287, and the like.

The components 222 to 246, 270, 276, 287, and 288 may be installed as separate circuits in the form of hardware, or alternatively may be installed as a part of the control section 210.

Alternatively, at least a part of the components 222 to 246, 270, 276, 287, and 288 may be implemented in the form of software as a function of the control section 210 that operates in accordance with a program stored in a memory (214).

In response to the wakeup signal from the wakeup section 270, the control section 210 provides control signals EN_MEM_CTRL, EN_SNSDT_CTRL, EN_CMP_CTRL, EN_SNS, and EN_SNS_CTRL for enabling or disabling the memory 214, the memory control section 276, the comparison section 287, the sensor 286, and the data read section 288.

In response to a tag information request command CMD from the reader/writer device 302, the control section 210 causes the memory control section 276 to read from the memory 214 a file of stored data DATA of the accumulated detected values.

The other points in the configuration and the operation of the RFID tag 204 are similar to those of the RFID tag 202 in FIG. 1.

Figure 6A:
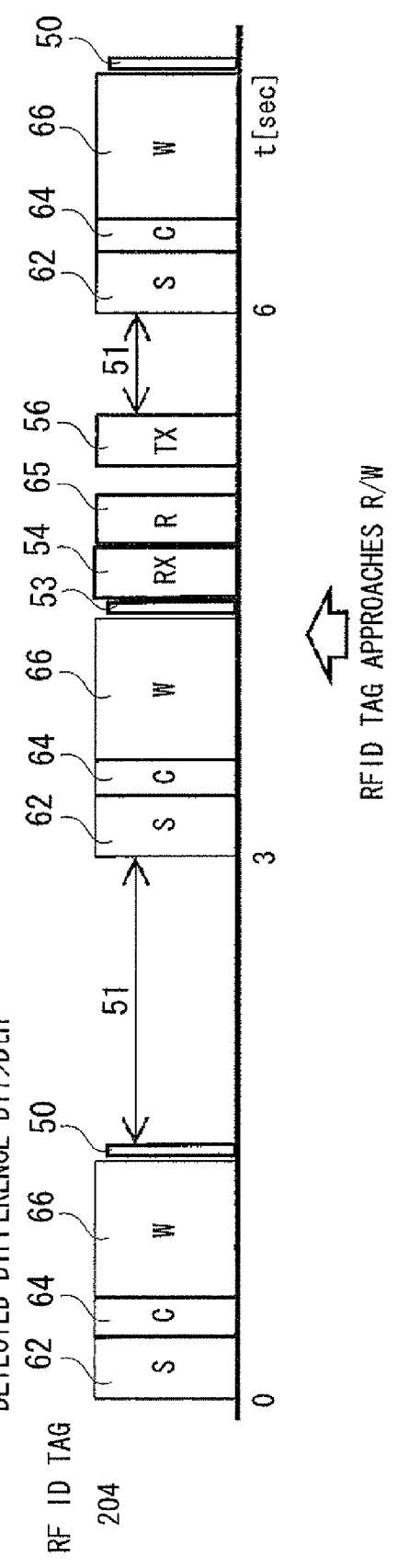
FIGS. 6A and 6B each illustrate a time chart of physical quantity detection (sensing), comparison, carrier sensing, write of detected value data into a memory, receiving RF signal reception processing, read of the accumulated detection value data from the memory, and transmission processing for an RF signal that carries response data in an active-type RFID tag in FIG. 5.
Figure 6B:
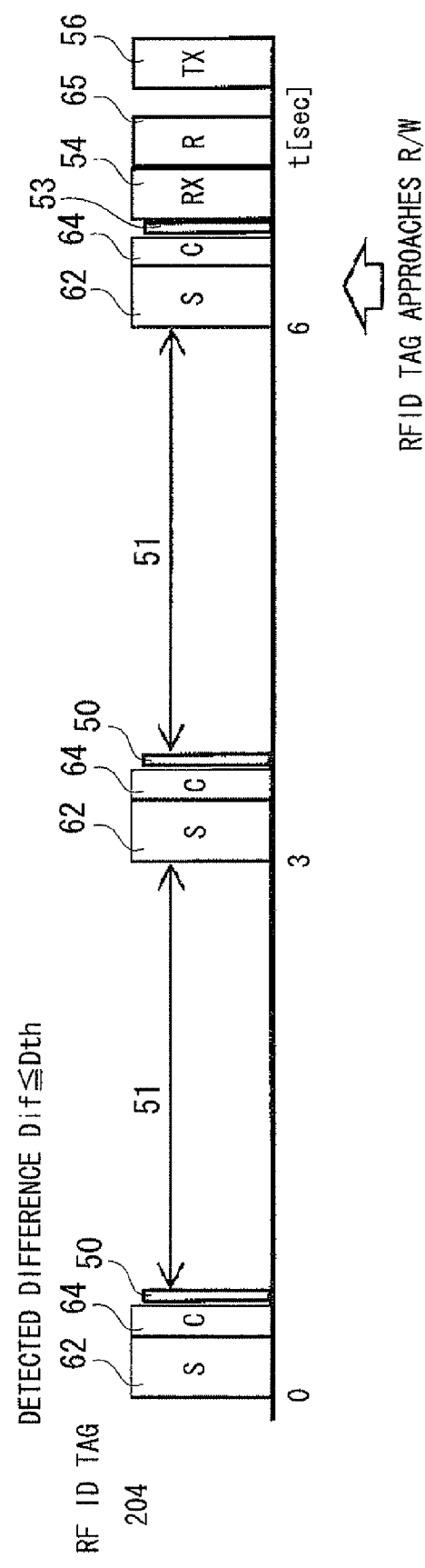

FIGS. 6A and 6B show time charts of physical quantity detection (sensing) 62, comparison 64, carrier sensing 50 and 53, write 66 of detected value data into the memory 214, receiving RF signal reception processing 54, read 65 of the accumulated detection value data from the memory 214, and transmission processing 56 for an RF signal that carries response data in the active-type RFID tag 204 in FIG. 5.

In the RFID tag 204, in accordance with a wakeup signal from the wakeup section 270, the control section 210 enables or disables the sensor 286 and the data read section 288 or alternatively the reception section 250 and the carrier judgment section 246.

The comparison section 287 acquires a detected value Dd of the sensor 286 from the data read section 288, and then stores the data into the memory 214.

The control section 210 performs carrier sensing 50 and 53 periodically. Then, in response to a tag information request command from the reader/writer device 302, the control section 210 transmits back the file of the data of detected values and the tag ID.

Referring to FIG. 6A, in the RFID tag 204, the control section 210 causes the sensor 286 to detect (S) the value Dc of physical quantity (e.g., ambient temperature) or a state in the environment in duration 62. Then, the control section 210 causes the data read section 288 to read the present data Dc in duration 64, and then compares (C) with a predetermined threshold value Dth the absolute value (Dif=|Dc−Ds|) of the difference between the present detected value Dc and the stored preceding detected value Ds.

When the absolute value Dif of the difference between the present detected value Dc and stored preceding value Ds exceeds the threshold value Dth (Dif>Dth), the comparison section 287 in duration 66 causes the memory control section 276 to write (W) the present detected value Dc into the memory 214, and further holds the detected value Dc as a new stored value Ds.

Then, the RFID tag 204 performs carrier sensing in durations 50 and 53.

In duration 65, the memory control section 276 reads from the memory 214 a file of stored data of a plurality of detected values recorded over a predetermined duration, and then provides it to the control section 210.

Referring to FIG. 6B, when the detected value Dc does not exceed the stored preceding value Ds (Dif≦Dth), the comparison section 287 does not cause the detected value Dc to be written into the memory 214. This reduces the power consumption for data storage and the required memory capacity.

Then, the RFID tag 204 performs carrier sensing in durations 50 and 53.

In a case that the comparison section 287 is not provided, the RFID tag 204 does not perform the operation shown in FIG. 6B is toughness.

In FIGS. 6A and 6B, in carrier sensing duration 53, when a carrier of a transmission signal from the reader/writer device 302 is detected, the RFID tag 204 receives the transmission signal.

In response to the tag information request command carried by the transmission signal, the control section 210 enables the memory control section 276 and the memory 214 by using the control signals EN_SNSDT_CTRL and EN_MEM_CTRL, then reads the file of the data of detected values stored in the memory 214 together with the tag ID, and then transmits them back.

The present inventors have recognized that power consumption can be reduced when both of physical quantity detection 62 and carrier sensing 50 and 53 are performed in response to a wakeup signal having a long period, but that the RFID tag 202 cannot transmit back a response to a request command from the approached reader/writer device 302 in a moderately short time.

The present inventors have recognized that in an RFID tag, when the period of carrier sensing and the period of physical quantity detection are set to be optimal values independently, the power consumption in the RFID tag can be reduced and still a response can be transmitted back to a request command from the reader/writer device in a moderately short time.

Figure 7:
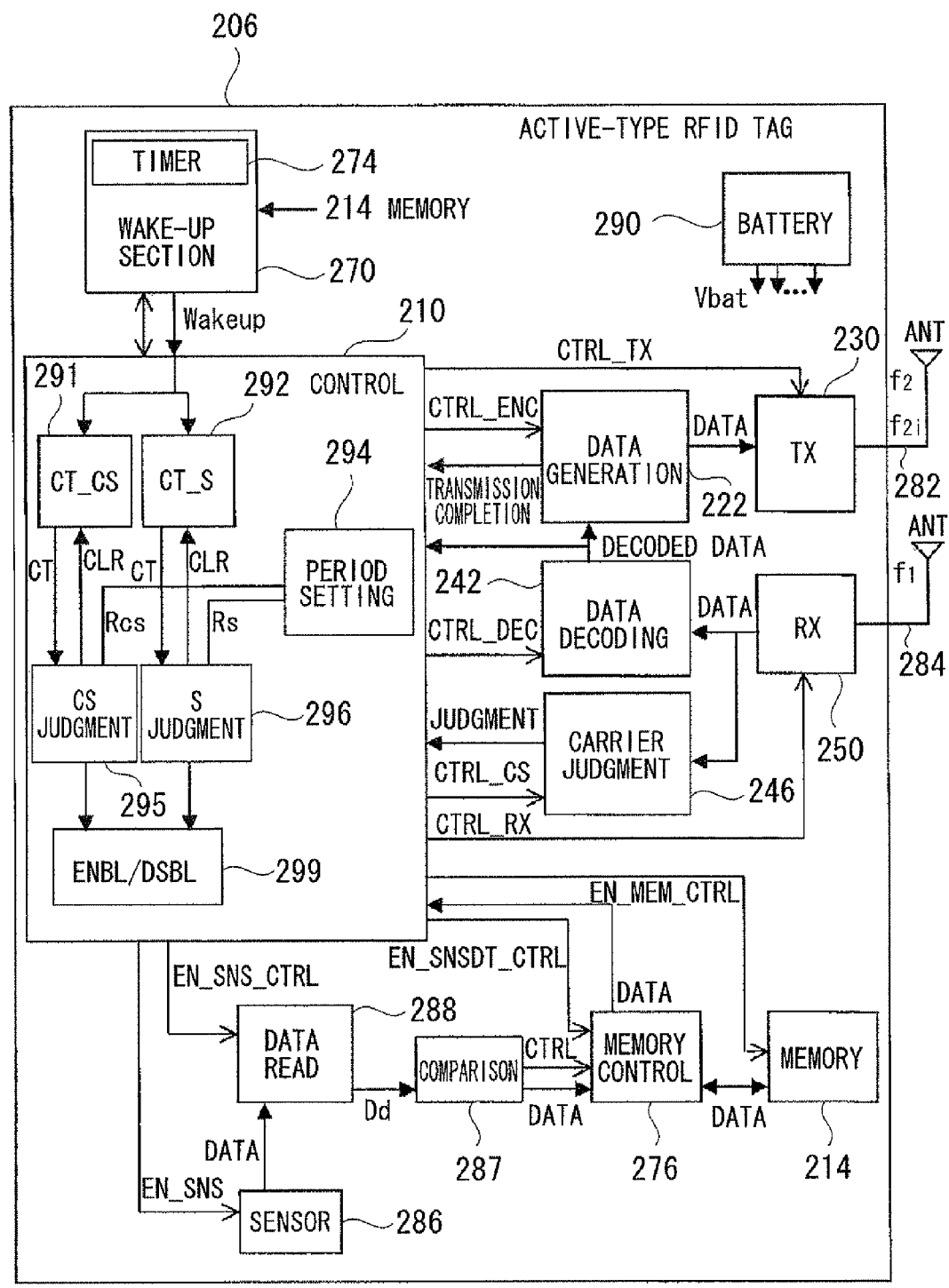
FIG. 7 illustrates a configuration of an active-type RFID tag serving as an active-type contactless information storage device according to an embodiment.

FIG. 7 illustrates a configuration of an active-type RFID tag 206 serving as an active-type contactless information storage device according to an embodiment.

The reader/writer device 302 in FIG. 1 may be used for the RFID tag 206.

The control section 210 of the RFID tag 206 includes a counter (CT_CS) 291 for carrier sensing and a counter (CT_S) 292 for physical quantity detection that count the wakeup signals from the wakeup section 270; a judgment section 295 for carrier sensing and a judgment section 296 for physical quantity detection that compare the counting values (CT_CS and CT_S) of the counters 291 and 292 with respective criterion values Rcs and Rs so as to judge whether they are equal to each other; an operation period setting section 294 that sets up the criterion value Rcs for carrier sensing and the criterion value Rs for physical quantity detection into the judgment sections 295 and 296, respectively; and an enabling/disabling control signal generating section 299 for providing an enabling/disabling control signal to the related components 246, 250, 286, 288, 276, 214 and the like.

The counters 291 and 292 are up counters or down counters.

The other points in the configuration of the RFID tag 206 are similar to those of the RFID tag 204 in FIG. 5.

In accordance with the threshold value Dth set up by the control section 210, the comparison section 287 performs comparison processing on the detected value data Dd of the sensor 286 extracted from the data read section 288, and then provides its comparison result (e.g., the necessity or non-necessity of storing of the data) to the control section 210 so as to cause the memory control section 276 to store the necessary detected value data Dd into the memory 214.

For this purpose, the control section 210 temporarily enables the memory control section 276 and the memory 214 by using the control signal EN_SNSDT_CTRL.

The memory control section 276 stores the necessary detected value data together with the present date and time into the memory 214.

In an example, the RFID tag 206 is used for managing the transportation route and the date and time of a thermally insulated container and tracking the temperature change in the container.

In this case, the sensor 286 is a temperature sensor.

FIG. 8A illustrates a time chart of transmission processing 42 for an RF signal that carries data containing a tag ID request or information request command (CMD) in a reader/writer device 302.

FIG. 8B illustrates a time chart of a receive ready state 46 and receiving RF signal reception processing 48 in the reader/writer device 302.

FIG. 8C illustrates a time chart of carrier sensing 50 and 53, physical quantity detection, read of detected value data and write 67 into the memory 214, receiving RF signal reception processing 54, read 65 of the accumulated detection value data from the memory 214, and transmission processing 56 for an RF signal that carries data containing tag information such as a tag ID and a response in an active-type RFID tag 206.

The reader/writer device 302 is arranged at a predetermined position for collecting the accumulated detected value data in the reader/writer device 307 that moves together with a product or the like.

Referring to FIG. 8A, the data generating section 322 of the reader/writer device 302 may generate data containing a detected value data read request command serving as a tag information request command to the RFID tag received from the control section 310, then encrypts the data in accordance with a predetermined cryptosystem, and then encodes the encrypted data in accordance with a predetermined encoding system so as to generate encoded encrypted data.

In each of successive time slots in the transmission processing 42, the transmission section 330 transmits an RF signal carrying the command periodically at short intervals.

Referring to FIG. 8C, in the active-type RFID tag 206, the control section 210 enables the sensor 286, the data read section 288, and the comparison section 279 in duration 67 having a length of, for example, 100 ms and generated with a period Tcs (e.g., 8 seconds) which is a predetermined multiple (Rs) (e.g., 8 times) of a predetermined period Tw (e.g., 1 second) of the wakeup signal from the wakeup section 270.

The control section 210 further enables the memory control section 276 and the memory 214, and then accumulates the detected value data into the memory 214.

On the other hand, the control section 210 enables the reception section 250 and the carrier judgment section 246 in durations 50 and 53 generated with a period Tcs (e.g., 3 seconds) which is another predetermined multiple (Rcs) (e.g., 3 times) of the period Tw of the wakeup signal.

For example, the RFID tag 206 causes the sensor 286 to perform physical quantity detection with a period of 8 seconds and causes the reception section 250 and the carrier judgment section 246 to perform carrier sensing of a receiving RF signal at a frequency f1 with a period of 3 seconds.

The criterion values (Rs and Rcs) indicating the above-mentioned predetermined multiples or the corresponding period lengths (Ts and Tcs) are set up or changed in accordance with a period setting request command from the reader/writer device 302.

It is preferable that the physical quantity detection period Ts is longer than the carrier sensing period Tcs, that is, the criterion value Rs is greater than the criterion value Rcs.

When the RFID tag 206 approaches the reader/writer device 302 so as to go into a communication-reachable range, a carrier of RF signal from the reader/writer device 302 is detected by the RFID tag 206.

The reception section 250 and the data decoding section 242 are enabled in a predetermined duration within the subsequent duration 54.

The reception section 250 receives and demodulates the RF signal so as to generate encoded encrypted data containing the command.

The data decoding section 242 decodes the data in accordance with a predetermined encoding system, then decrypts the encrypted data in accordance with a predetermined cryptosystem so as to extract the detected value data read request command, and then provides the command to the control section 210.

In response to the command, the control section 210 reads the file of the accumulated detected value data from the memory 214 in the subsequent duration 65.

The control section 210 encrypts the response data containing the accumulated detected value data in accordance with a predetermined cryptosystem in a duration or a time slot 56 within a predetermined subsequent duration selected at random, then encodes the encrypted data, and then transmits back an RF signal at a frequency f2 that carries the encoded data.

In sleep duration 51 between operation durations 67, 50, 52, and 56, the RFID tag 206 goes into a sleep mode, while only the control section 210 and the wakeup section 270 are in an enabled or powered-ON state. The other components are disabled or powered down.

Referring to FIG. 8B, the reception section 350 of the reader/writer device 302 is always in a receive ready state 46. Thus, when the RFID tag 206 approaches it so that an RF signal is received, the reception section 350 demodulates the receiving RF signal so as to generate an encoded encrypted data in the duration of reception processing 48.

The data decoding section 342 decodes the encoded encrypted data in accordance with a predetermined encoding system, then decrypts the decoded encrypted data in accordance with a predetermined cryptosystem so as to reproduce the response data containing the tag ID and the detected value data, and then provides the reproduced response to the control section 310.

In response to the received reproduced response, the control section 310 provides the tag ID and the detected value data to the host computer.

The host computer processes the tag ID and the detected value data, and uses them for monitoring and managing the product distribution or the person.

Each of FIGS. 9A to 9C illustrates an example of a configuration of a frame containing a diverse command transmitted by the reader/writer device 302.

In FIG. 9A, the tag ID request command includes a start byte, a tag ID request command, a data length, data (or dummy data), an end byte, and a check byte (CRC).

In FIG. 9B, the detected value data read request command includes a start byte, a detected value data read request command, a data length, data (or dummy data), an end byte, and a check byte (CRC).

In FIG. 9C, the period setting request command includes a start byte, a carrier sensing (CS) and detection (S) period setting request command, the value of carrier sensing (CS) period, the value of detection (S) period, a data length, data (or dummy data), an end byte, and a check byte (CRC).

Figure 10C:
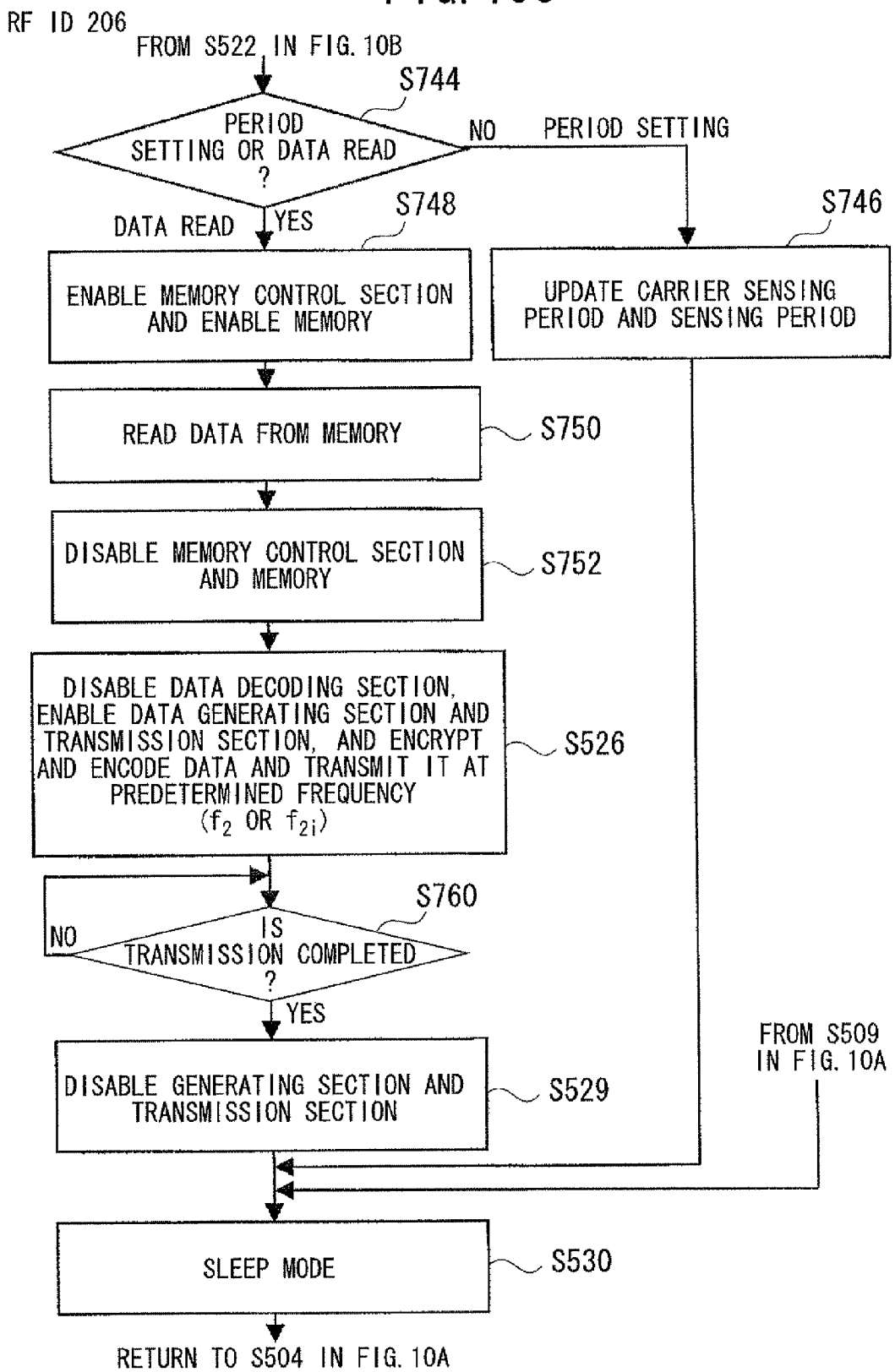

FIGS. 10A to 10C illustrate processing executed by the active-type RFID tag 206 in FIG. 7.

Here, for simplicity in the figure, authentication processing in FIGS. 4A and 4B and the operation of the comparison section 287 are not shown.

Further, it is assumed that the threshold value (Dth) for comparison in the comparison section 287 is 0 (zero) or low and that the entirety of the detected value data of the sensor 286 is stored in the memory 214.

Referring to FIG. 10A, Operations S502 to S504 are similar to those in FIG. 4A. Thus, their description is omitted here.

At Operation S606 after Operation S504, in accordance with that the wakeup signal is in an ON state, the individual counting values in the counters 291 and 292 are incremented (increased).

At Operation S610, the judgment section 296 judges whether the counting value CT_Sin the counter 292 is equal to the criterion value Rs (e.g., 8 or 10).

When it is judged that the counting value CT_S is not equal to the criterion value Rs, the procedure goes to Operation S642.

When it is judged at Operation S610 that the counting value CT_S is equal to the criterion value Rs, the judgment section 296 at Operation S612 clears and resets the counting value CT_Sin the counter 292 into 0 (zero).

At Operation S708, the control section 210 enables the sensor 286 and the data read section 288 so as to cause the sensor 286 to detect the temperature and cause the data read section 288 to read the detected value.

At Operation S712, the control section 210 disables the sensor 286 and the data read section 288.

At Operation S720, the control section 210 enables the memory control section 276 and the memory 214.

At Operation S722, the control section 210 temporarily enables the comparison section 287. Then, the memory control section 276 stores into the memory 214 the present detected temperature value Dc from the comparison section 287, that is, the stored detection temperature value Ds.

At Operation S724, the control section 210 disables the memory control section 276 and the memory 214.

Referring to FIG. 10B, at Operation S642, the judgment section 295 judges whether the counting value CT_CS in the counter 291 is equal to the criterion value Rcs (e.g., 3).

When it is judged that the counting value CT_CS is not equal to the criterion value Rcs, the procedure returns to Operation S504.

When it is judged that the counting value CT_CS is equal to the criterion value Rcs, the judgment section 295 at Operation S644 clears and resets the counting value CT_CS in the counter 291 into 0 (zero).

Then, the procedure goes to Operation 508.

Operations S508 to S522 are similar to those in FIG. 4A. Thus, their description is omitted here.

Referring to FIG. 10C, at Operation S744 after Operation S522, the control section 210 judges whether the received command is a detected value data read request command or a carrier sensing period and detection period setting request command.

When it is judged as being a period setting request command, the control section 210 at Operation S746 causes the operation period setting section 294 to set up or update respectively into the judgment sections 295 and 296 the criterion value Rcs indicating the carrier sensing period Tcs and the criterion value Rs indicating the physical quantity detection period Ts received from the reader/writer device 302.

Then, the procedure goes to Operation S530.

When it is judged at Operation S744 that the received command is a detected value data read request command, in response to this command at Operation S748, the control section 210 enables the memory control section 276 and the memory 214.

At Operation S750, the memory control section 276 reads from the memory 214 a file of stored data of a plurality of detected temperature values recorded over a predetermined duration, and then provides it to the control section 210 (duration 65).

At Operation S752, the control section 210 disables the memory control section 276 and the memory 214.

Operation S526 is similar to that in FIG. 4B.

The control section 210 transmits to the reader/writer device 302 an RF signal that carries the file of the stored data of detection temperature values and the tag ID that are encrypted and encoded.

At Operation S760, the control section 210 judges whether the transmission has been completed.

Operation S760 is repeated until the transmission is completed.

When it is judged that the transmission has been completed, the procedure goes to Operation S529.

Operation S529 is similar to that in FIG. 4B.

At Operation S530, the control section 210 brings the RFID tag 207 into a sleep mode.

In a sleep mode, only the control section 210 and the wakeup section 270 are in an enabled or powered-ON state. The other components 214, 222 to 250, 276, and 286 to 288 are disabled or powered down.

Then, the procedure returns to Operation S504.

According to an exemplary embodiment, in the RFID tag 206, the carrier sensing period Tcs and the physical quantity detection period Ts can individually be set into optimal values in accordance with particular application by the reader/writer device 202.

Accordingly, the RFID tag 206 can transmit a response signal to a command from the reader/writer device 202 in a moderately short time in a state that the power consumption is reduced.

Figure 11:
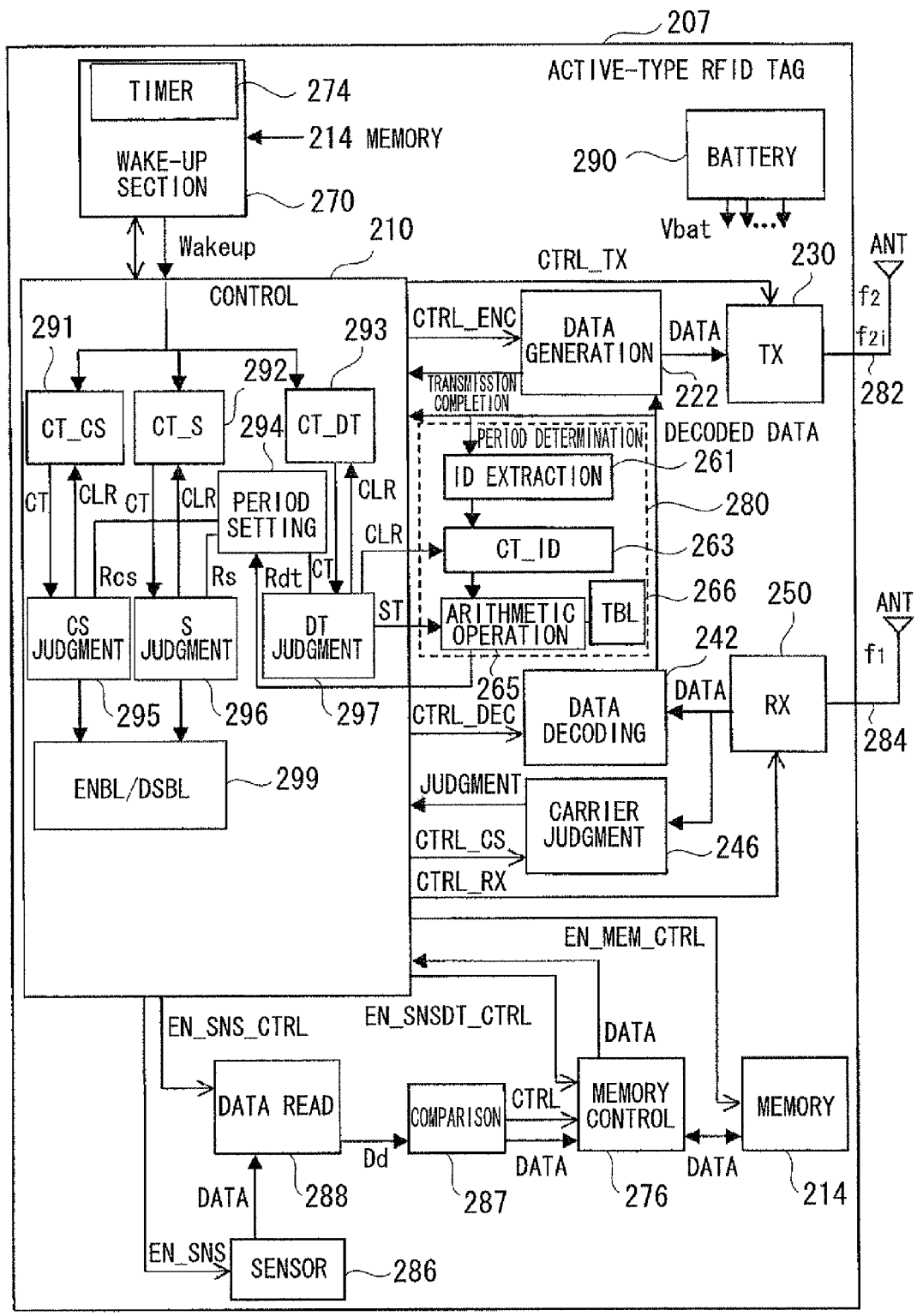
FIG. 11 illustrates a configuration of an active-type RFID tag serving as an active-type contactless information storage device according to an embodiment.

FIG. 11 illustrates a configuration of an active-type RFID tag 207 serving as an active-type contactless information storage device according to an embodiment o.

The reader/writer device 302 in FIG. 1 may be used for the RFID tag 207.

In addition to the components 291, 292, 294, 295, 296, 299 and the like, the control section 210 of the RFID tag 207 includes a counter (CT_DT) 293 for operation period determination; and a judgment section 297 for operation period determination.

The RFID tag 207 has an operation period determining section 280.

The operation period determining section 280 includes a reader/writer ID extraction section 281 for receiving decoded (decrypted) received data from the data decoding section 242 and then extracting the ID of the reader/writer device from the data; a counter (CT_ID) 283 for counting the number of IDs extracted by the reader/writer ID extraction section 281; and an arithmetic operation section 265 for calculating necessary operation periods (Tcs and Ts) for carrier sensing and physical quantity detection or criterion values (Rcs and Rs) for counting, based on a table TBL.

The other points in the configuration of the RFID tag 207 are similar to those of the RFID tag 206 in FIG. 7.

The counter 283 is an up counter or a down counter.

The judgment section 297 judges whether the counted number CT_DT of wakeup signals in the counter 293 has reached the criterion value Rdt or the period Tdt.

When the counting value CT_DT reaches the criterion value Rdt, the arithmetic operation section 265 is activated, and then the counter 263 is cleared.

The criterion value Rdt expresses the period Tdt (=wakeup signal period×Rdt) for counting the number of received reader/writer IDs.

The period Tdt is longer than the period Tcs.

FIG. 12 illustrates the table TBL indicating a relation between: the counted number CT_ID of IDs received from a reader/writer device 302 by the RFID tag 207 in a time duration of one period Tdt (e.g., 60 seconds); the value of carrier sensing period Tcs; and the value of physical quantity detection period Ts.

This table TBL is stored in a table memory 266 or in the memory 214.

In FIG. 12, when the detected number of IDs of reader/writer devices in 60 seconds is 0 (zero), the carrier sensing period Tcs has the longest value of 10 seconds, while the physical quantity detection period Ts is 15 minutes (900 seconds).

This is because the possibility that a reader/writer device is located in the vicinity is low.

When the detected number of IDs of reader/writer devices in 60 seconds falls within a range of 1 to 9, the carrier sensing period Tcs has a medium value of 5 seconds, while the physical quantity detection period Ts is 15 minutes.

This is because the possibility that a reader/writer device is located in the vicinity is at a medium level.

When the detected number of IDs of reader/writer devices in 60 seconds is 10 or greater, the carrier sensing period Tcs has the shortest value of 1 second, while the physical quantity detection period Ts is none or infinity. That is, physical quantity detection is interrupted.

Alternatively, the physical quantity detection period Ts may have the longest value of 30 minutes.

This is because the possibility that a reader/writer device is located in the vicinity is high and hence priority should be given to the transmission of a response.

Figure 13A:
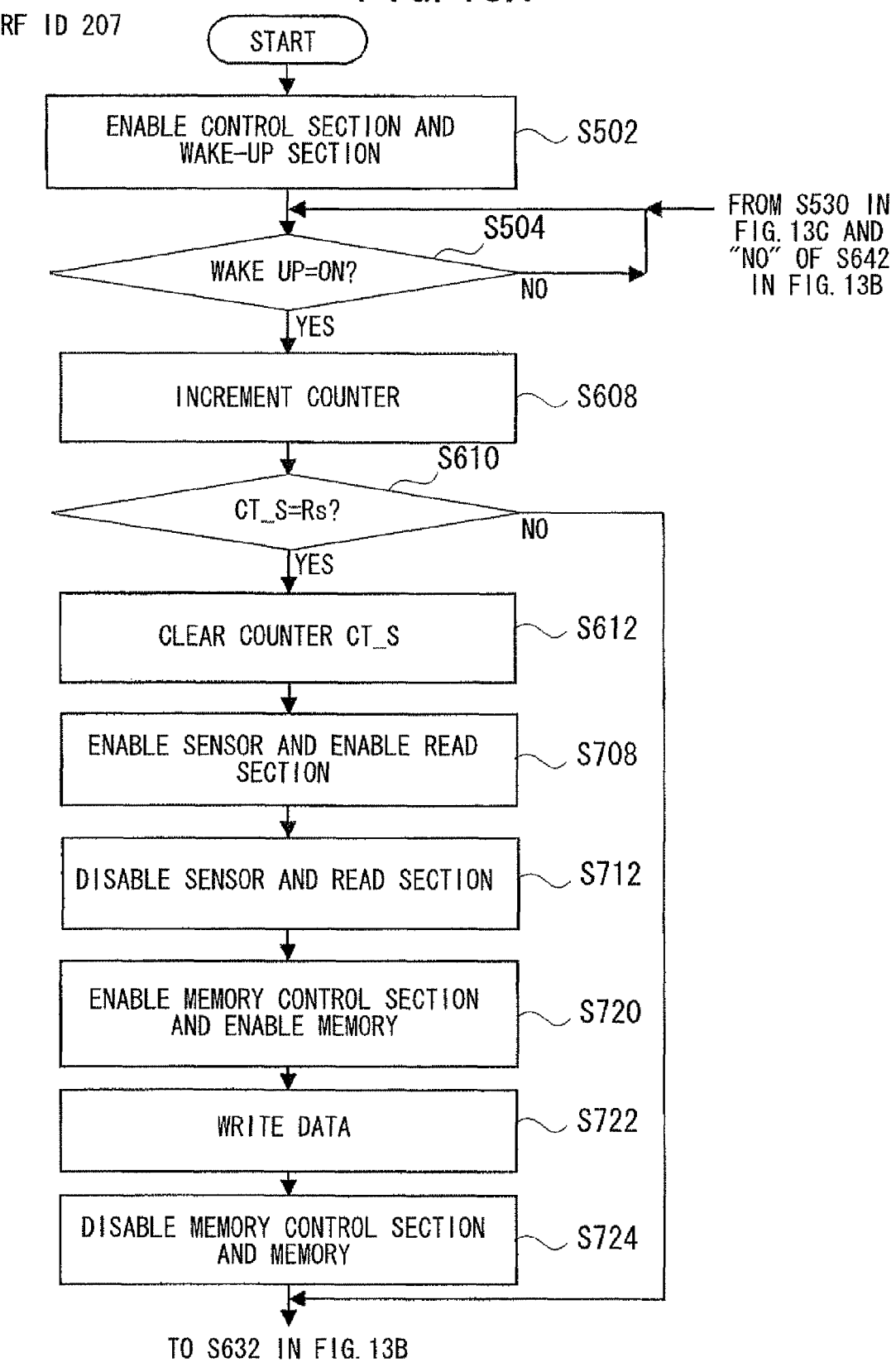
Figure 13B:
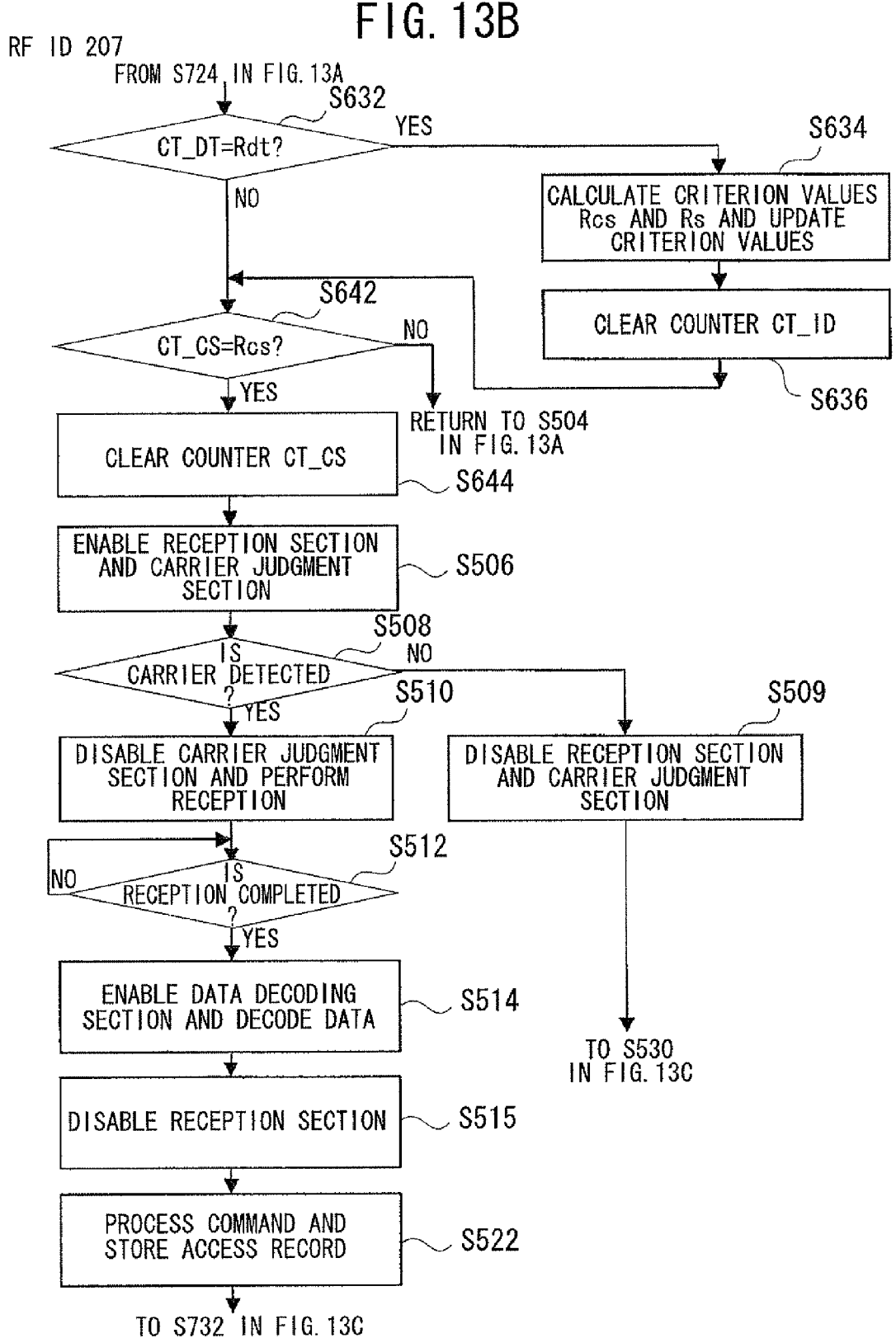

FIGS. 13A to 13C illustrate processing executed by the active-type RFID tag 207.

Referring to FIG. 13A, Operations 502 to 504 are similar to those in FIG. 10A.

At Operation S608 after Operation S504, in accordance with that the wakeup signal is in an ON state, the individual counting values in the counters 291, 292, and 293 are incremented (increased) (+1).

Operations S610 and S708 to S724 are similar to those in FIG. 10A.

Referring to FIG. 13B, at Operation S632 after Operation S724, the judgment section 297 judges whether the counting value CT_ID in the counter 293 is equal to the criterion value Rdt.

When it is judged that the counting value CT_ID is not equal to the criterion value Rid, the procedure goes to Operation S642.

When it is judged that the counting value CT_ID is equal to the criterion value Rid, the criterion values Rcs and Rs are calculated or determined at Operation S634 in accordance with the table TBL as described above. Then, the value is transferred to the operation period setting section 294. Then, the operation period setting section 294 updates the criterion values Rcs and Rs in the judgment sections 295 and 296.

At Operation 636, the judgment section 297 clears and resets the counting value CT_DT in the counter 293 into 0 (zero).

Then, the procedure goes to Operation S508.

Then, the procedure goes to Operation S642.

Operations S642 to S644 and S506 to S522 are similar to those in FIG. 10B.

Referring to FIG. 13C, at Operation S732 after Operation S522, the reader/writer ID extraction section 261 extracts an ID of a reader/writer device from the decoded (decrypted) received data so as to judge whether such an ID has been detected.

When it is judged that an ID is not detected, the procedure goes to Operation S734.

At Operation S732, when it is judged that an ID has been detected, the reader/writer ID extraction section 261 increments (increases) the counting value CT_ID in the counter 263.

Then, the procedure goes to Operation S748.

Operation Ss 748 to 760 and 526 to 530 are similar to those in FIG. 10C.

According to an exemplary embodiment, without the necessity of a period setting request command from the reader/writer device 202, the RFID tag 207 can autonomously set up the carrier sensing period and the physical quantity detection period to be optimal values individually in accordance with the position of the reader/writer device 202.

Accordingly, the RFID tag 207 can transmit a response signal to a command from the reader/writer device 202 in a moderately short time in accordance with the environment in a state that the power consumption is reduced.

Figure 14:
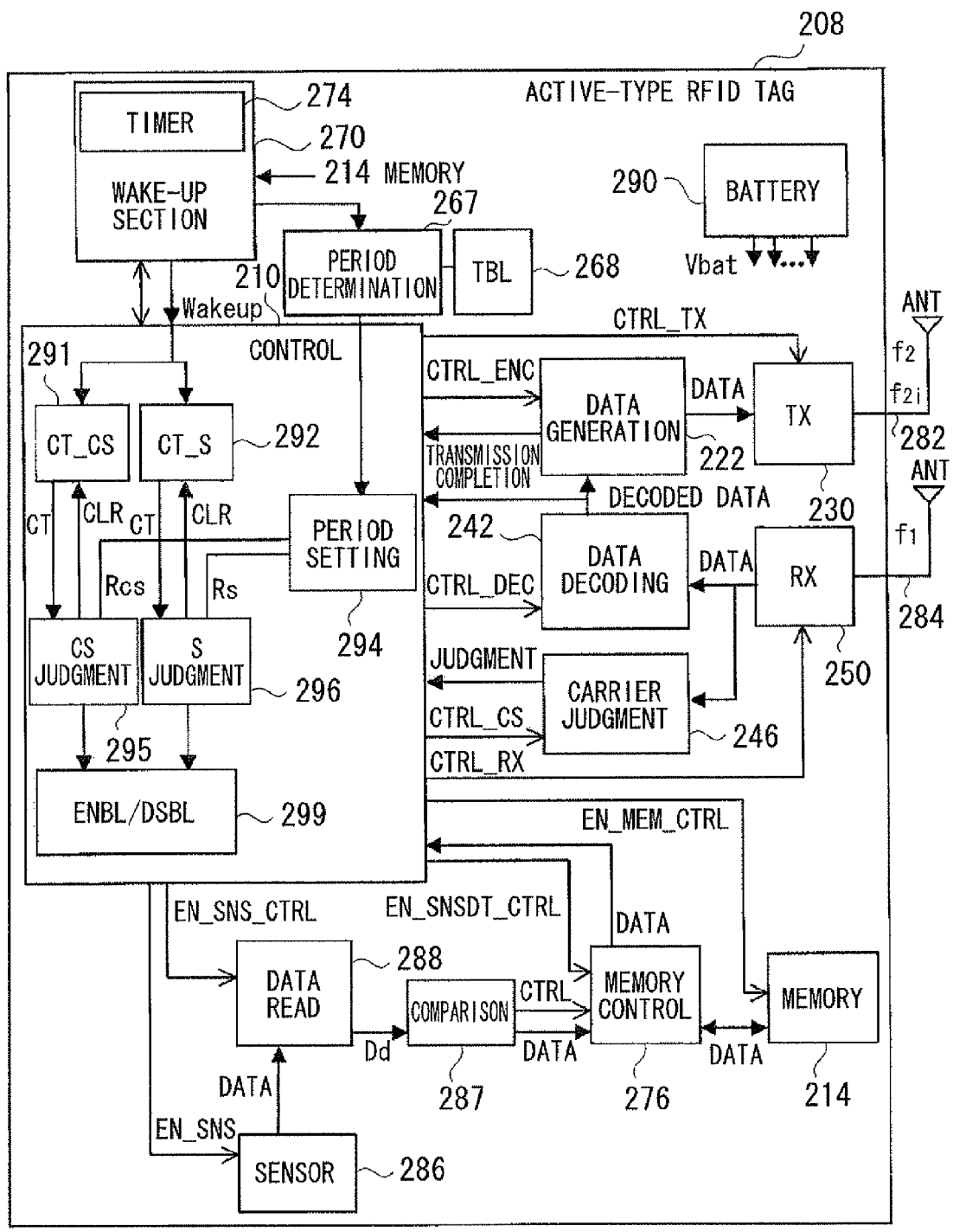
FIG. 14 illustrates a configuration of an active-type RFID tag serving as an active-type contactless information storage device according to an embodiment.

FIG. 14 illustrates a configuration of an active-type RFID tag 208 serving as an active-type contactless information storage device according to yet another embodiment of the present invention which is another modification of FIG. 7.

The reader/writer device 302 in FIG. 1 may be used for the RFID tag 208.

The RFID tag 208 includes an operation period determining section 267.

The other points in the configuration of the RFID tag 208 are similar to those of the RFID tag 206 in FIG. 7.

The operation period determining section 267 determines the carrier sensing period Tcs and the physical quantity detection period Ts in accordance with the time-of-day information from the wakeup section 270 based on a table TBL indicating the relation of the carrier sensing period Tcs and the physical quantity detection period Ts to the time of day.

FIG. 15 illustrates a table indicating a relation between: the time zone; the value of carrier sensing period Tcs; and the value of physical quantity detection period Ts.

This table is stored in a table memory 268 or in the memory 214.

In FIG. 15, in the duration from 22:00 to 07:00, the carrier sensing period Tcs has the longest value of 10 seconds, while the physical quantity detection period Ts is 15 minutes (900 seconds).

This is because the frequentness of access from reader/writer devices is remarkably low from midnight to early morning.

In the duration from 12:00 to 13:00 and from 17:00 to 22:00, the carrier sensing period Tcs has a medium value of 5 seconds, while the physical quantity detection period Ts is 15 minutes.

This is because the frequentness of access from reader/writer devices is somewhat low during the lunch break and in the duration after main office hours.

In the duration from 7:00 to 12:00 and from 13:00 to 17:00, the carrier sensing period Tcs has a medium value of 1 second, while the physical quantity detection period Ts is none or infinity. That is, physical quantity detection is interrupted.

As substitute constitution, the physical quantity detection period Ts may have the longest value of 30 minutes.

This is because in the duration of main office hours, the frequentness of access from reader/writer devices is high and hence priority should be given to the transmission of a response.

Figure 16A:
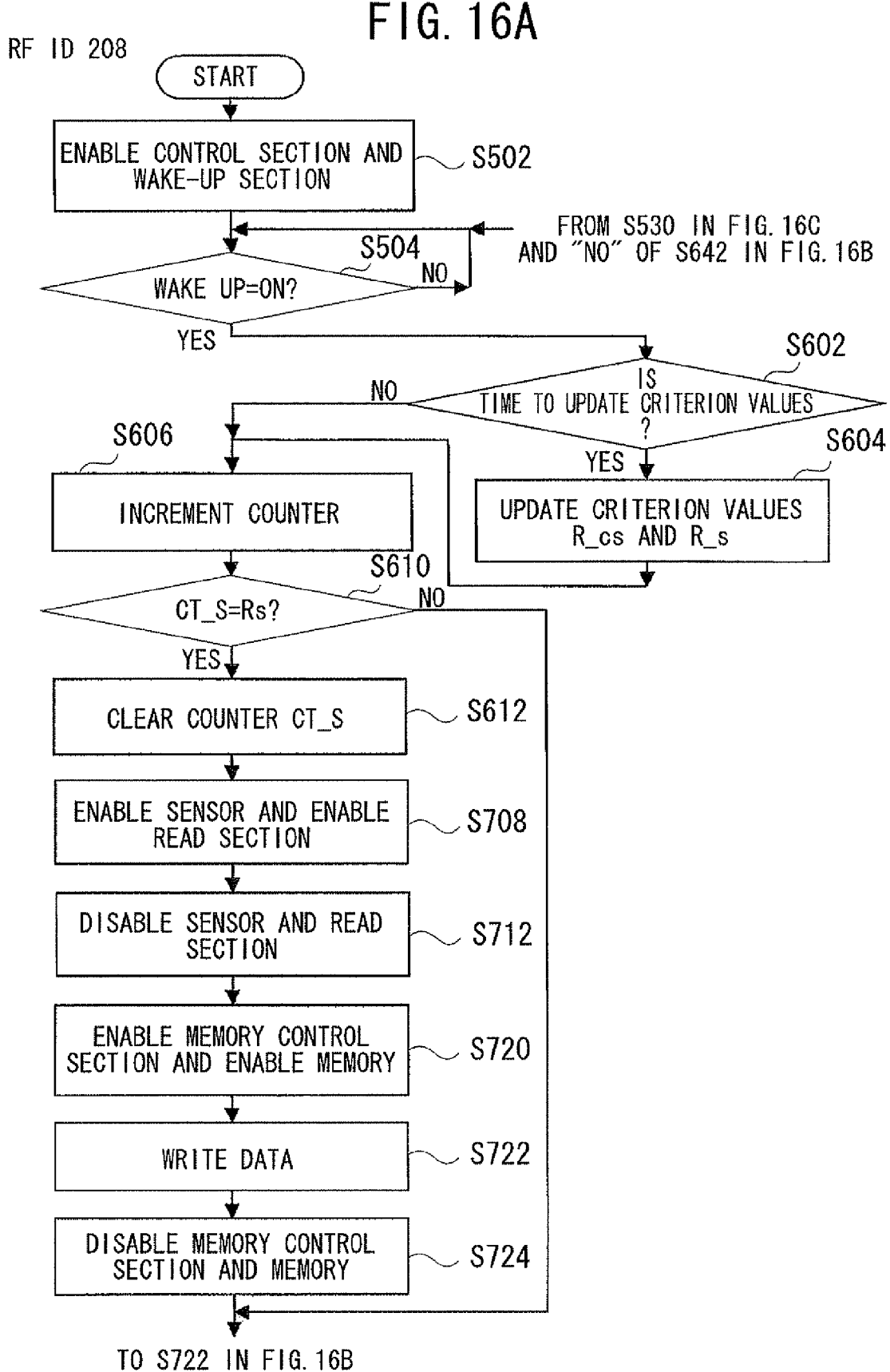
Figure 16B:
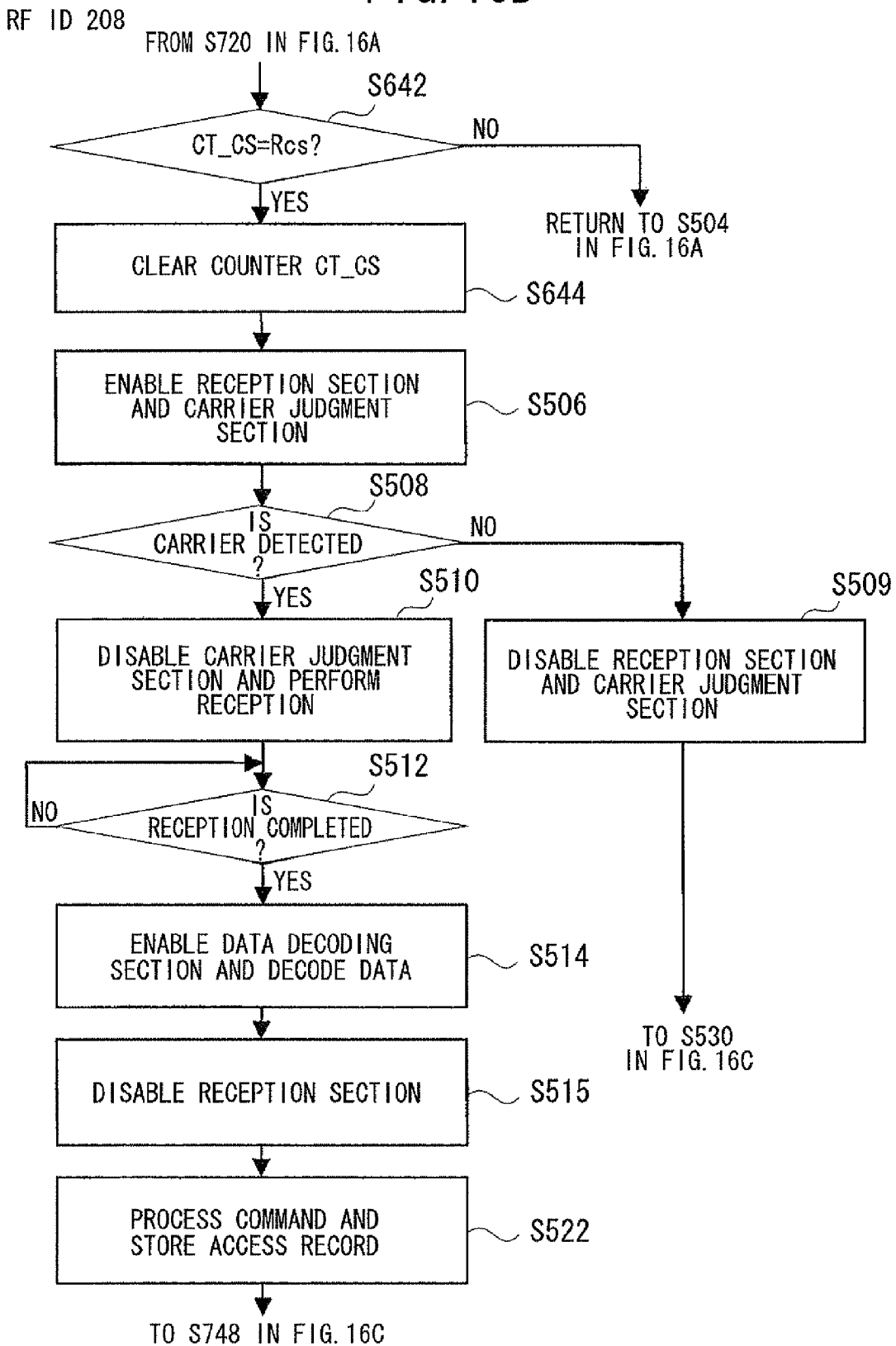

FIGS. 16A to 16C illustrate processing executed by the active-type RFID tag 208.

Referring to FIG. 13A, Operations 502 to 504 are similar to those in FIG. 10A.

At Operation S602 after Operation S504, the operation period determining section 267 judges whether it is time to update the criterion value Rcs and/or the criterion value Rs based on the present time information from the wakeup section 270 and the table shown in FIG. 15.

When it is judged as not being time to update a value, the procedure goes to Operation S606.

When it is judged as being time to update a value, the operation period determining section 267 at Operation S604 determines the criterion value Rcs and/or the criterion value Rs based on the present time in accordance with the table, and then provides the result to the operation period setting section 294.

The operation period setting section 294 sets up or updates the criterion value Rcs indicating the carrier sensing period and the criterion value Rs indicating the physical quantity detection period Ts into the judgment sections 295 and 296.

Operations S606 to 612 and 708 to 724 are similar to those in FIG. 10A.

Referring to FIG. 16B, Operations S642 to 644 and 506 to 522 are similar to those in FIG. 10B.

Referring to FIG. 16C, after Operation S522, the procedure goes to Operation S748.

Operations 748 to 760 and 529 to 530 are similar to those in FIG. 10C.

According to an exemplary embodiment, without the necessity of a period setting request command from the reader/writer device 202, the RFID tag 208 can autonomously set up the carrier sensing period and the physical quantity detection period to be optimal values individually in accordance with the time of day.

Accordingly, the RFID tag 208 can transmit a response signal to a command from the reader/writer device 202 in a moderately short time in accordance with the time of day in a state that the power consumption is reduced.

Figure 17:
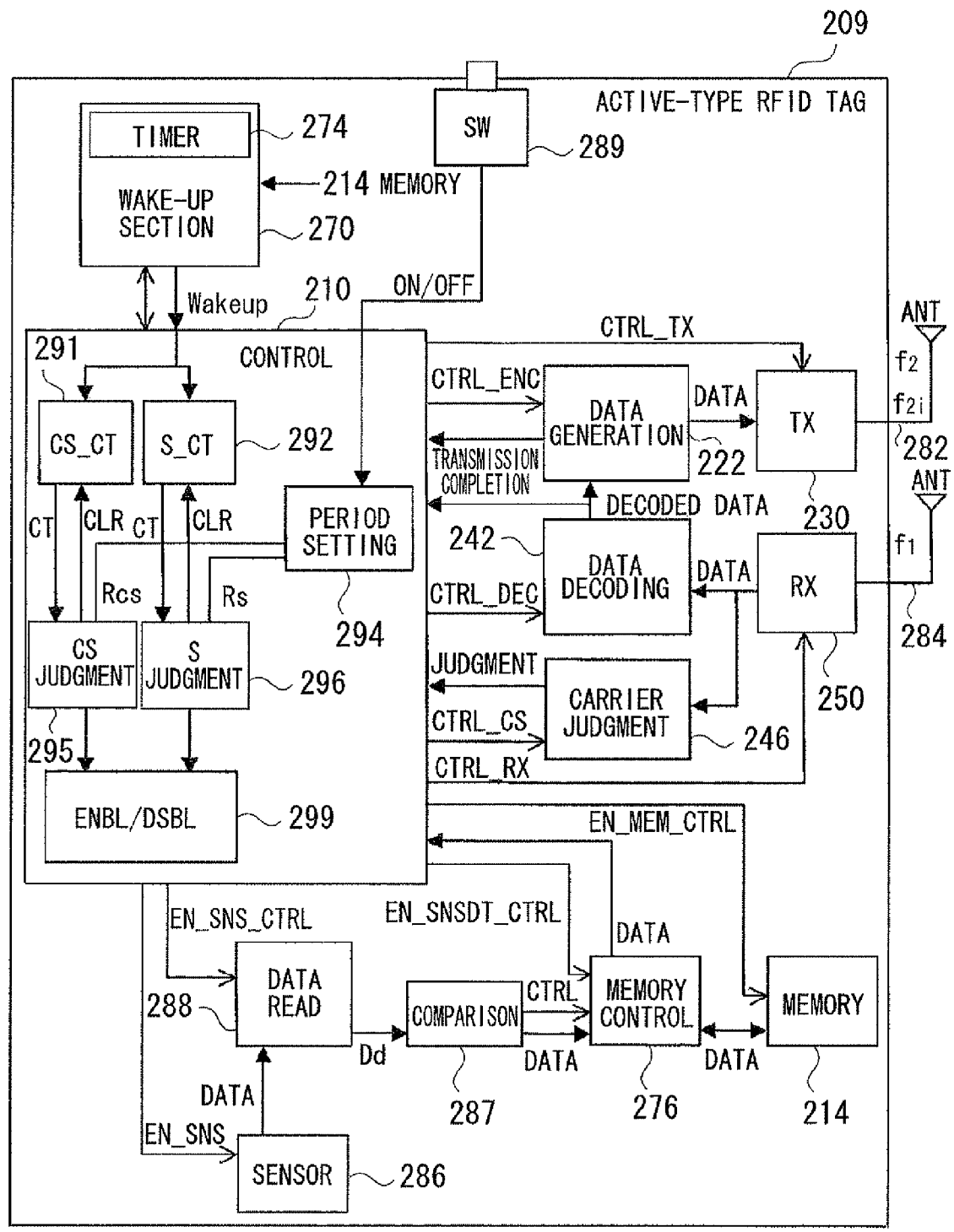
FIG. 17 illustrates a configuration of an active-type RFID tag serving as an active-type contactless information storage device according to an embodiment.

FIG. 17 illustrates a configuration of an active-type RFID tag 209 serving as an active-type contactless information storage device according an embodiment.

The reader/writer device 302 in FIG. 1 may be used for the RFID tag 209.

The RFID tag 209 includes a manual ON/OFF switch 289.

The other points in the configuration of the RFID tag 209 is similar to that in FIG. 7.

In general, the RFID tag 209 operates in a mode similar to that of the RFID tag 206 in FIG. 7.

When the switch 289 is pressed into an ON state by a user, in response to this, the operation period setting section 294 forcedly sets up the carrier sensing period Tcs alone into the shortest value (e.g., 1 second).

After that, when the switch 289 is pressed into an OFF state by the user, in response to this, the operation period setting section 294 restores the carrier sensing period Tcs into the original value.

As substitute constitution, the switch 289 may go into an ON state for a predetermined duration after pressed by a user, and then may return to an OFF state.

According to an exemplary embodiment, in the RFID tag 209, without the necessary of a period setting request command from the reader/writer device 202, the carrier sensing period can manually and forcedly be set up short by a user.

Accordingly, the RFID tag 209 can transmit a response signal to a command from the reader/writer device 202 in a short time depending on the necessity in a state that the power consumption is reduced.

According to an aspect of an embodiment, the detection period for a physical quantity or state and the carrier sensing period in an information device can be set up independently. This can reduce the power consumption in the information device.

In the description given above, has been described in relation to RFID tags. However, it is obvious to an expert in this field that an exemplary embodiment is not limited to this and is applicable also to contactless IC cards.

Although a few embodiments have been shown and described, it would be appreciated by those skilled in the art that changes may be made in these embodiments without departing from the principles and spirit of the invention, the scope of which is defined in the claims and their equivalents. The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, failing within the scope thereof.

What is claimed is:

1. An information device capable of performing wireless communication with a reader/writer device, the information device comprising:
   a reception section which, when activated, detects information request signals transmitted from said reader/writer device;
   a transmission section which, when activated, transmits a response signal to said reader/writer device in response to the detection of a respective information request signal by said reception section;
   a detection data acquisition section which, when activated, acquires detection data corresponding to a physical quantity or state from a sensor for detecting said physical quantity or state;
   a detection data storage section which holds the detection data acquired by said detection data acquisition section;
   a first control section which activates said detection data acquisition section at a first time period so that the data detection acquisition section thereby acquires the detection data at the first time period, the detection data being acquired at the first time period being held by said detection data storage section; and
   a second control section which activates said reception section at a second time period so that the reception section thereby detects the information request signals at the second time period, and, when a respective information request signal is detected by the reception section, activates said transmission section so that the transmission section thereby transmits the response signal to said reader/writer device, the transmitted response signal including the detection data held in said detection data storage section; and
   a third control section which adjusts the first and second time periods independently of each other in accordance with a number of times that the information request signals are detected by the reception section.

2. The information device according to claim 1, further comprising:
   a number-of-times-of-detection acquisition section which counts the number of times that the information request signals are detected by said reception section,
   wherein the third control section controls said first control section or said second control section based on the counted number.

3. The information device according to claim 1, further comprising:
   a number-of-times-of-detection acquisition section which counts the number of times that the information request signals are detected by said reception section,
   wherein said third control section comprises at least one of:
      a first processing section which increases said first time period when the counted number is at or above a predetermined threshold;
      a second processing section which reduces said second time period when the counted number is at or above a predetermined threshold;

a third processing section which causes said first control section to sleep when the counted number is at or above a predetermined threshold; and a fourth processing section which activates said second control section when the counted number is at or above a predetermined threshold.

4. The information device according to claim 1, further comprising:

a number-of-times-of-detection acquisition section which counts the number of times that the information request signals are detected by said reception section, wherein said third control section comprises at least one of:
a first processing section which reduces said first time period when the counted number is below a predetermined threshold;

a second processing section which increases said second time period when the counted number is below a predetermined threshold;

a third processing section which activates said first control section when the counted number is below a predetermined threshold; and a fourth processing section which causes said second control section to sleep when the counted number is below a predetermined threshold.

5. The information device according to claim 1, wherein said first control section:

compares the detection data held in said detection data storage section with the detection data obtained by the detection data acquisition section when said detection data acquisition section is activated at said first time period, to thereby produce a comparison result; and when the comparison result indicates a difference between the detection data held in said detection data storage section and the detection data obtained by the detection data acquisition section is at or above a predetermined threshold, the first control section inputs into said detection data storage section the detection data obtained from the detection data acquisition section.

6. The information device according to claim 1, further comprising a switch which provides a switching signal to said second control section when pressed by a user, wherein said second control section reduces said second time period in response to said switching signal.

7. An information device according to claim 1, wherein the information device is an active RFID tag.

8. A computer-readable recording medium that stores a program used in an information device capable of performing wireless communication with a reader/writer device, the information device comprising: a reception section which, when activated, detects information request signals transmitted from said reader/writer device; a transmission section which, when activated, transmits a response signal to said reader/writer device in response to the detection of a respective information request signal by said reception section; a detection data acquisition section which, when activated, acquires detection data corresponding to a physical quantity or state from a sensor for detecting said physical quantity or state; and a detection data storage section which holds the detection data acquired by said detection data acquisition section, and the program, when executed by a computer, causing operations to be performed, the operations comprising:

a first control operation of activating said detection data acquisition section at a first time period so that the data detection acquisition section thereby acquires the detection data at the first time period, the detection data being acquired at the first time period being held by said detection data storage section;

a second control operation of activating said reception section at a second time period so that the reception section thereby detects the information request signals at the second time period, and, when a respective information request signal is detected by the reception section, activating said transmission section so that the transmission section thereby transmits the response signal to said reader/writer device, the transmitted response signal including the detection data held in said detection data storage section; and a third control operation of adjusting the first and second time periods independently of each other in accordance with a number of times that the information request signals are detected by the reception section.

9. A computer-readable recording medium according to claim 8, wherein the information device is an active RFID tag.

10. A method used in an information device capable of performing wireless communication with a reader/writer device, the information device comprising: a reception section which, when activated, detects information request signals transmitted from said reader/writer device; a transmission section which, when activated, transmits a response signal to said reader/writer device in response to the detection of a respective information request signal by said reception section; a detection data acquisition section which, when activated, acquires detection data corresponding to a physical quantity or state from a sensor for detecting said physical quantity or state; and a detection data storage section which holds the detection data acquired by said detection data acquisition section, and the method comprising:

a first control operation of activating said detection data acquisition section at a first time period so that the data detection acquisition section thereby acquires the detection data at the first time period, the detection data being acquired at the first time period being held by said detection data storage section;

a second control operation of activating said reception section at a second time period so that the reception section thereby detects the information request signals at the second time period, and, when a respective information request signal is detected by the reception section, activating said transmission section so that the transmission section thereby transmits the response signal to said reader/writer device, the transmitted response signal including the detection data held in said detection data storage section; and a third control operation of adjusting the first and second time periods independently of each other in accordance with a number of times that the information request signals are detected by the reception section.

11. A method according to claim 10, wherein the information device is an active RFID tag.

12. An active RFID tag capable of performing wireless communication with a reader/writer device, the active RFID tag comprising:

a reception section which, when activated, detects information request signals transmitted from the reader/writer device;

a detection data acquisition section which, when activated, acquires detection data corresponding to a physical quantity or state from a sensor for detecting said physical quantity or state;

a first control section which activates the detection data acquisition section at a first time period so that the data detection acquisition section thereby acquires the detection data at the first time period; and a second control section which activates the reception section at a second time period so that the reception section thereby detects the information request signals at the second time period; and a third control section which adjusts the first and second time periods independently of each other in accordance with a number of times that the information request signals are detected by the reception section.

13. An active RFID tag capable of performing wireless communication with a reader/writer device, the active RFID tag comprising:

a reception section which, when activated, detects information request signals transmitted from the reader/writer device;

a detection data acquisition section which, when activated, acquires detection data corresponding to a physical quantity or state from a sensor for detecting said physical quantity or state;

a first control section which activates the detection data acquisition section at a first time period so that the data detection acquisition section thereby acquires the detection data at the first time period; and a second control section which activates the reception section at a second time period so that the reception section thereby detects the information request signals at the second time period; and means for adjusting the first and second time periods independently of each other in accordance with a number of times that the information request signals are detected by the reception section.

\* \* \* \* \*

UNITED STATES PATENT AND TRADEMARK OFFICE
CERTIFICATE OF CORRECTION

PATENT NO. : 8,274,384 B2
APPLICATION NO. : 12/241709
DATED : September 25, 2012
INVENTOR(S) : Shinichi Shiotsu et al.

It is certified that error appears in the above-identified patent and that said Letters Patent is hereby corrected as shown below:

Title Page 2, line 5, under FOREIGN PATENT DOCUMENTS,
Change "JP 2006-85573 3/2006" to --JP2006-085573 3/2006--.

Signed and Sealed this
Fourth Day of June, 2013

Teresa Stanek Rea
*Acting Director of the United States Patent and Trademark Office*